US006342547B1

(12) United States Patent
Mimura et al.

(10) Patent No.: US 6,342,547 B1
(45) Date of Patent: Jan. 29, 2002

(54) EPOXY RESIN COMPOSITION FOR SF6 GAS INSULATING DEVICE AND SF6 GAS INSULATING DEVICE

(75) Inventors: Kenji Mimura; Hiromi Ito; Hiroyuki Nishimura; Kazuharu Kato; Hirofumi Fujioka; Yukio Ozaki; Hiroyuki Hama, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/497,215

(22) Filed: Feb. 3, 2000

(30) Foreign Application Priority Data

Feb. 4, 1999 (JP) .......................................... 11-027725

(51) Int. Cl.[7] ............................ C08K 3/34; C08L 63/02
(52) U.S. Cl. ....................................... 523/443; 523/466
(58) Field of Search ................................. 523/443, 466

(56) References Cited

U.S. PATENT DOCUMENTS 4,020,306 A 4/1977 Zahner et al.

FOREIGN PATENT DOCUMENTS

| | | | |
|---|---|---|---|
| JP | 47-48720 | | 12/1972 |
| JP | 73027119 | * | 8/1973 |
| JP | 48044179 | * | 12/1973 |
| JP | 1-247449 | | 10/1989 |
| JP | 5-146035 | | 6/1993 |

OTHER PUBLICATIONS

Derwent Publications, AN 1974–80182V, JP 49 038718, Oct. 19, 1974.

Patent Abstracts of Japan, vol. 014, No. 229 (C–0733), Jun. 27, 1990, JP 02 097553, Apr. 10, 1990.

Patent Abstracts of Japan, vol. 016, No. 394 (C–0976), Aug. 21, 1992, JP 04 130126, May 1, 1992.

* cited by examiner

*Primary Examiner*—Robert Dawson
*Assistant Examiner*—D. Aylward
(74) *Attorney, Agent, or Firm*—Oblon, Spivak, McClelland, Maier & Neustadt, P.C.

(57) ABSTRACT

There is provided an epoxy resin composition, which has superior resistant property to $SF_6$ gas, mechanical strength and cracking resistance in a well balanced manner and which can provide an insulating molded article having a low dielectric constant. The epoxy resin composition for an $SF_6$-gas insulating device of the present invention is obtained by adding a silicate compound powder to an epoxy resin.

16 Claims, 13 Drawing Sheets

Kinds of filler

○ : Alumina (Comparative Example 1),
● : Fused Silica (Comparative Example 2)
□ : Forsterite (Example 1), △ : Fayalite (Example 2),
× : Tephroite (Example 3),
▲ : Knebelite (Example 4), ◇ : Montecellite (Example 5),
+ : Zircon (Example 6)

Filler
○ : Alumina (Comparative Example 1),
● : Fused Silica (Comparative Example 2),
□ : Cordierite (Example 7), △ : Wollastonite (Example 8),
× : Sanidine (Comparative Example 3)

Kinds of filler

○ : Alumina (Comparative Example 1),

● : Fused Silica (Comparative Example 2),

□ : Forsterite/Wollastonite/Heat Resistant Polyimide (Example 9),

△ : Forsterite/Aluminium Fluoride/Heat Resistant Polyimide (Example 10),

× : Alumina/Polyamideimide (Example 11)

□ : MgO Amount 60 % (Example 16)
▲ : MgO Amount 34 % (Example 17)
△ : MgO Amount 95 % (Example 21)
× : MgO Amount 20 % (Example 23)
◑ : MgO Amount 15 % (Example 24)
■ : MgO Amount 80 % (Example 25)
○ : Alumina (Comparative Example 4)
● : Silica (Comparative Example 5)

□ : MgO Amount 60 % (Example 16)
■ : MgO Amount 70 % (Example 26)
△ : MgO Amount 50 % (Example 27)
○ : Alumina (Comparative Example 4)
● : Silica (Comparative Example 5)

△ : CaO Amount 44 % (Example 18)
□ : CaO Amount 75 % (Example 28)
■ : CaO Amount 20 % (Example 31)
○ : Alumina (Comparative Example 4)
● : Silica (Comparative Example 5)

■ : MgO Amount 26 %, CaO Amount 36 % (Example 19)
△ : MgO Amount 31 %, CaO Amount 43 % (Example 32)
□ : MgO Amount 26 %, CaO Amount 60 % (Example 33)
▲ : MgO Amount 18 %, CaO Amount 29 % (Example 34)
× : MgO Amount 10 %, CaO Amount 24 % (Example 35)
◑ : MgO Amount 36 %, CaO Amount 18 % (Example 36)
○ : Alumina (Comparative Example 4)
● : Silica (Comparative Example 5)

EPOXY RESIN COMPOSITION FOR SF6 GAS INSULATING DEVICE AND SF6 GAS INSULATING DEVICE

BACKGROUND OF THE INVENTION

The present invention relates to an epoxy resin composition, which can be preferably applied to an insulating members such as an insulating support member and an insulating spacer between electric members, used for a switching device of an $SF_6$ gas insulating device for sealing $SF_6$ gas, an inner-gas-duct power transmitting device and other electric apparatuses.

SUMMARY OF THE INVENTION

In recent years, $SF_6$ gas having a superior electrical insulating property has come to be used as an insulating medium for insulating devices such as transformer devices and breakers. Although the $SF_6$ gas is chemically stable, it is decomposed by corona discharging or arc discharging generated inside the insulating device to form $SF_2$, $SF_4$, $S_2F_2$, $SO_3$, $SOF_4$, and $SO_2F_4$. Among these, $SF_4$ reacts with water existing in the insulating device to be decomposed as shown in the following reaction formulas (1) and (2) so that HF gas is generated.

$$SF_4+H_2O \rightarrow SOF_2+2HF \quad (1)$$

$$SOF_2+H_2O \rightarrow SO_2+2HF \quad (2)$$

With respect to parts such as insulating members including an insulating member such as an insulating support member and an insulating spacer between electric members, used for a switching device of an insulating device using $SF_6$ gas as an insulating medium, an inner-gas-duct power transmitting device and other electric apparatuses, an insulating molded article made from an epoxy resin composition has been conventionally used because it has superior insulating property, mechanical property and moldability. With respect to the filler thereof, silica ($SiO_2$) powder is used since it has a low dielectric constant and a high mechanical strength. Therefore, the silica powder is decomposed and deteriorates as shown in the following reaction formula (3):

$$SiO_2+4HF \rightarrow SiF_4+2H_2O$$

As a result, the surface resistance of the insulating molded article becomes low to carry out dielectric breakdown. And as corrosion develops, its mechanical properties also deteriorate.

In order to solve this problem, for example, Japanese Unexamined Patent Publications Nos. 247449/1989 (Tokukaihei 1-247449), 130126/1992 (Tokukaihei 4-130126) and 341711/1992 (Tokukaihei 4-341711) disclose techniques, wherein aluminum oxide (alumina) powder having a resistant property (hereinafter referred to as "$SF_6$-gas resistance") to decomposed products (HF gas) generated from $SF_6$ gas is used as the filler.

However, since the alumina powder normally has a comparatively high dielectric constant of 9 to 11, the dielectric constant of the insulating molded article containing the alumina powder also becomes high. In particular, in recent years, along with development of high-voltage, miniaturized electric apparatuses containing insulating devices, an insulating molded article that can be resistant to severer service conditions have been demanded. From the electrical viewpoint, since a reduction in the corona discharging starting voltage through modification in shape has become a major objective, it is not preferable to have a higher dielectric constant. Reduction of a filling amount of alumina powder is also suggested, but this results in degradation in the mechanical strength and cracking resistance of the insulating molded product.

As a filler having a dielectric constant lower than alumina powder and an $SF_6$-gas resistance, examples are dolomite, sodium fluoride, aluminum fluoride, magnesium fluoride and the like. However, an insulating molded article comprising an epoxy resin composition containing these fillers fails to provide proper mechanical strength, cracking resistance, and moldability. Moreover, Japanese Examined Patent Publication No. 38718/1974 (Tokukoushou 49-38718) discloses a technique in which cordierite is used together with magnesium fluoride as a filler. But the above-mentioned problem has not still been solved.

Namely, development of an epoxy resin composition has been demanded, which has superior resistance to decomposed products (HF gas) from $SF_6$ gas, mechanical strength and cracking resistance in a well balanced manner and can provide an insulating molded article having a low dielectric constant.

In order to solve the above-mentioned problems, the objective of the present invention is to provide an epoxy resin composition which has superior resistance to $SF_6$ gas, mechanical strength and cracking resistance in a well balanced manner and which can provide an insulating molded article having a low dielectric constant.

The present invention relates to an epoxy resin composition for an $SF_6$-gas insulating device, which is obtained by adding a silicate powder to an epoxy resin.

Moreover, the present invention relates to an epoxy resin composition for an $SF_6$-gas insulating device, which is obtained by adding a silicate powder, or a silicate powder and an inorganic powder other than the silicate compound, to an epoxy resin.

In these cases, the silicate compound is preferably an independent silicate.

Moreover, the silicate compound is preferably a cyclic silicate.

Moreover, the silicate compound is preferably a linear silicate.

Furthermore, the independent silicate is preferably selected from the group consisting of forsterite, fayalite, tephroite, knebelite and monticellite that have an olivine structure.

And the independent silicate is preferably zircon.

Moreover, the cyclic silicate is preferably cordierite.

Moreover, the linear silicate is preferably wollastonite that belongs to the pyroxene group.

Furthermore, the silicate powder preferably comprises fine particles having an average particle diameter of not more than 100 $\mu$m or needle-shaped substances having an average fiber diameter of not more than 100 $\mu$m.

The epoxy resin composition for an $SF_6$-gas insulating device is obtained by further adding to an epoxy resin an organic powder or fiber, which has a glass transition temperature of not less than 140° C. and a linear expansion coefficient of not more than 40 ppm/° C. at a temperature not more than the glass transition temperature.

The present invention also relates to an epoxy resin composition for an $SF_6$-gas insulating device, which is obtained by adding to an epoxy resin an inorganic powder other than the silicate compound and an organic powder or fiber having a glass transition temperature of at least 140° C. and a linear expansion coefficient of at most 40 ppm/° C. at a temperature not more than the glass transition temperature.

In these cases, preferably the silicate compound mainly comprises MgO and $SiO_2$.

In this case, an amount of MgO is preferably 16 to 94% by weight in the composition.

Moreover, preferably the silicate compound mainly comprises CaO and $SiO_2$.

In this case, an amount of CaO is preferably 20 to 90% by weight in the composition.

Moreover, preferably the silicate compound mainly comprises CaO, MgO and $SiO_2$.

In this case, a total amount of MgO and CaO component is preferably 20 to 90% by weight in the composition.

It is also possible to use a mixture obtained by mixing at least one kind selected from the group consisting of a silicate compound mainly comprising MgO and $SiO_2$, a silicate compound mainly comprising CaO and $SiO_2$ and a silicate compound mainly comprising CaO, MgO and $SiO_2$.

The present invention also relates to a molded article made from the epoxy resin compound for an $SF_6$-gas insulating device, and also relates to an $SF_6$-gas insulating device using the molded article.

DETAILED DESCRIPTION

Figure 1A:
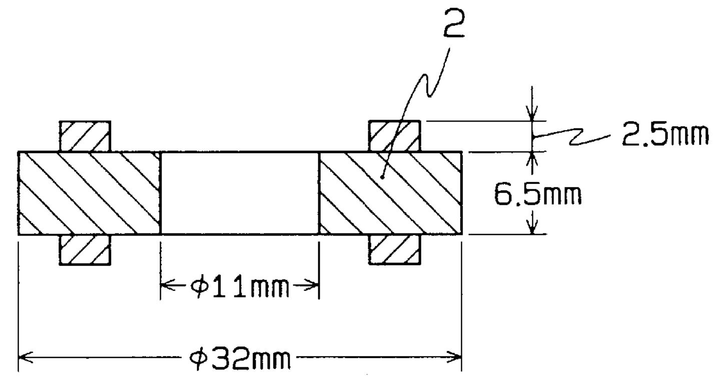
FIG. 1 is an explanatory drawing showing the shape of an olyphant-washer made of aluminum.

The present invention relates to an epoxy resin composition used for an $SF_6$-gas insulating device, which is formed by adding a silicate powder to an epoxy resin.

There is no particular limitation for the epoxy resin used in the present invention, as long as the resin has at least two epoxy groups, an epoxy equivalent of 100 to 5000, and a softening temperature of not less than 200° C. Examples thereof are a bisphenol epoxy resin, a phenol-novolak epoxy resin, a cresol-novolak epoxy resin, a glycidyl-ether epoxy resin, a glycidyl-ester epoxy resin, a glycidyl-amine epoxy resin, a linear aliphatic epoxy resin, an alicyclic epoxy resin, a heterocyclic epoxy resin, a halogenated epoxy resin, a biphenyl epoxy resin, a cyclopentadiene epoxy resin, a naphthalene epoxy resin and the like. However, the epoxy resin is not limited thereto in the present invention. Moreover, not particularly limited by an epoxy resins, thermosetting resins such as a phenol resin and an unsaturated polyester resin may also be adopted.

The above-mentioned epoxy resin can be used solely, or in a combination use of two or more thereof. Among those, a bisphenol epoxy resin and an alicyclic epoxy resin are preferable from the viewpoint of viscosity, heat resistance and mechanical property of the resulting molded article.

As the bisphenol epoxy resin, examples thereof are a bisphenol-A epoxy resin, a bisphenol-F epoxy resin, a bisphenol-S epoxy resin, a bisphenol-D epoxy resin, a brominated bisphenol-A epoxy resin, and a bisphenol-A epoxy resin modified with isocyanate. From the viewpoint of resin viscosity at molding and heat resistance and mechanical strength of the resulting set article, it is preferable to use a bisphenol epoxy resin having an epoxy equivalent of 100 to 2000 with a softening temperature of not more than 150° C.

As the alicyclic epoxy resin, examples thereof are cyclohexeneoxide epoxy resins synthesized by, for example, a peroxidization method, such as vinylcyclohexenedioxide, dicyclopentadieneoxide, 3,4-epoxy-cyclohexyl-3',4'-epoxycyclohexanecarboxylate, and polyglycidylester epoxy resins such as diglycidyl hexahydrophthalate and diglycidyl tetrahydrophthalate. From the viewpoint of superior balance between heat resistance and mechanical strength, it is preferable to use an alicyclic epoxy resin having an epoxy equivalent of 100 to 2000 with a softening temperature of not more than 150° C.

Next, the silicate powder of the present invention is explained below. The silicate powder of the present invention serves as a filler for adding mechanical strength to the resulting molded article. And it has a better durability to decomposed products (HF gases) from $SF_6$ gas than silica that has been conventionally used as a filler, and features that its dielectric constant is lower than that of alumina. The best feature of the present invention is that a silicate powder having these advantages is used as the filler for an epoxy resin composition used for an $SF_6$-gas insulating device.

There is no particular limitation for the silicate compound, as long as it can be dispersed in the epoxy resin. Examples thereof are listed as follows, these may be used solely or in a combination use of two or more thereof.

(i) Independent silicates such as Forsterite ($2MgO.SiO_2$), Fayalite ($2FeO.SiO_2$), Tephroite ($2MnO.SiO_2$), Knebelite ($FeO.MnO.SiO_2$) and Moticellite ($CaO.2MgO.SiO_2$) which belong to the olivine group; Zircon ($ZrO_2.SiO_2$); Almandine ($Fe_3^{2+}Al_2Si_3O_{12}$), Andradite ($Ca_3(Fe^{3+},Ti)_2Si_3O_{12}$), Grossular ($Ca_3Al_2Si_3O_{12}$), Spessartine ($Mn_3Al_2Si_3O_{12}$) and Uvarovite ($Ca_3Cr_2Si_3O_{12}$), which belongs to the garnet group; Phenacite ($Be_2SiO_4$) and KEIAENKOU ($Zn_2SiO_4$), which belongs to the phenacite group; and Sillimanite ($Al_2O(SiO_4)$), Andalusite ($Al_2O(SiO_4)$), Topaz ($Al_2O)(SiO_4)(OH, F)_2$), Kyanite ($Al_2O(SiO_4)$), which belong to the aluminum silicate group.

(ii) Cyclic silicates such as Cordierite ($Al_3Mg_2$ ($Si_5AlO_{18}$) and Beryl ($Be_3Al_2(Si_6O_{18})$).

(iii) Linear silicates such as Enstarite ($MgSi_2O_5$), Steatite ($MgSi_2O_5$), Diopside ($CAMgSi_2O_6$), Spodumene ($LiAlSi_2O_6$), Jadeite (NaAl $Si_2O_6$), Wollastonite ($CaSiO_3$) and Rhodonite ($MnSiO_3$), which belongs to the pyroxene group; and Tremolite ($Ca_2Mg_5(OH)_2(Si_4O_{11})_2$) and Anthophylite (Mg, $Fe)_7(OH)_2(Si_4O_{11})_2$), which belong to the amphibole group.

(iv) Besides the above, complex silicates such as Sodium melilite ($NaCaAlSi_2O_7$), Gehlenite ($Ca_2Al_2Si_2O_7$) and Akermanite ($Ca_2MgSi_2O_7$), which belong to the melilite group; layered silicates, such as Muscovite ($K_2Al_2Mg_2(OH)_4[(Si_4O_{10})_2]$, muscovite ($K_2Al_4(OH)_4[(Si_4AlO_{10})_2]$ and Pallagonite ($NaAl_2Mg_2(OH)_4[(Si_4O_{10})_2]$, which belong to the mica group, Pyroohyllite ($Al_4(OH)_4[(Si_4O_{10})_2]$), Talc ($Mg_6(OH)_4[Si_4O_{10})_2]$), kaolinite ($Al_4(OH)_8(Si_4O_{10})$ belonging to the kaolinite group, and Montmorillonite ($(Na)_{0.7}(Al_{3.3}Mg_{0.7})(OH)_4[(Si_4O_{10})_2]$) belonging to the Montmorillonite group; and stereo-network silicates such as Sodium feldspar ($NaAlSi_3O_8$), Feldspar ($KAlSi_3O_8$), Celsian ($BaAl_2Si_2O_8$), Anorthite ($CaAl_2Si_2O_8$) and Sanidine ($KAlSi_3O_8$) which belong to the feldspar group, Nepheline ($NaAlSiO_4$ and $Na_3K(Al_4Si_4O_{16})$) and Carnegieite ($KAlSiO_4$), which belong to the nepheline group, Analcite ($NaAlSi_2O_6.H_2O$) and Sodium zeolite ($Na_2Al_2Si_3O_{10}.2H_2O$) which belong to the zeolite group, and Sodalite ($Na_8[Al_6Si_6O_{24}].Cl_2$) and Nosean ($Na_8[Al_6Si_6O_{24}].SO_4$), which belong to the sodalite group.

The silicate having the lowest dielectric constant is quartz (silica: $SiO_2$) of the stereo-network silicates. In the stereo-network silicates, each Si—O tetrahedral body shares all the four apexes with the adjacent Si—O tetrahedral body to form a three-dimensional network structure. Therefore, it has a fine structure with a high hardness and superior mechanical strength. But this structure is susceptible to corrosion by hydrofluoric acid. For this reason, consideration was given to silicate compounds which have the secondary lowest dielectric constant next to quartz (silica: $SiO_2$) and are industrially produced, and these silicate compounds were evaluated on the $SF_6$-gas resistance and mechanical property.

The feldstar group and semi-feldstar group that are the stereo-network silicates are inferior in a resistance to hydrofluoric acid since they have the same structure as quartz (silica: $SiO_2$) and since, together with Si, they have alkali metals such as K, Na and Ca dissolved therein, which tend to dissociate into ions by corrosion due to hydrofluoric acid to decrease electric insulating property, and the zeolite group is also inferior in a resistance to the hydrofluoric acid since crystallization water is contained in its composition.

Mica and Talc, which are typical for natural ores, belong to layered silicates. In the layered silicate, its Si—O tetrahedral body shares three apexes, thereby making a flat plate structure (two-dimensional network structure). The layered silicate is superior in electrical properties, but peeling between the layers takes place to a great degree since the layers are connected by a weak van der Waals force and hydrofluoric acid chemically affects the interlayer structure. Therefore, as reported before (International Seminar of the Electric Society S. 4-3; 1989), the layered silicate such as mica is inferior in the $SF_6$-gas resistance.

Therefore, the three kinds of silicates, independent silicates, cyclic silicates and linear silicates, are particularly useful.

The independent silicate has a structure in which the respective Si—O tetrahedral bodies exist individually in a separated manner as a simple substance, that is, a structure in which Si—O tetrahedral bodies do not share any apexes and exist individually with cations located between the Si—O tetrahedral bodies to connect the bodies in a manner to neutralize the $(SiO_4)^{4-}$ ion. In particular, the olivine group has a structure in which the $(SiO_4)^{4-}$ ions are chemically connected to each other with divalent cations located at the oxygen atoms ($R_2^{2+}[SiO_4]$, $R^{2+}$=Mg, $Fe^{2+}$, Ca). As those naturally obtained, example is olivine ((Mg, $Fe_2^{2+}$) $SiO_4$), which is a solid solution of forsterite and fayalite. The forsterite forming the end component of the solid solution is considered to be a typical compound forming the mantle of earth. In this case, $Mg^{2+}$ ions are coordinated around an $(SiO_4)^{4-}$ ion in a manner as to neutralize it. The oxygen is virtually in a state of hexagonal closest packed structure, a silica atom is located at the fourth coordinate position and a magnesium atom at the sixth coordinate position.

The cyclic silicate is a silicate compound having a structure, in which $SiO_4$ groups having a tetrahedral structure are cyclically connected to each other, cations exist in such a manner as neutralizing $(SiO_2O_7)^{6-}$, $(Si_3O_9)^{6-}$, $(Si_4O_{12})^{8-}$ and $(Si_6O_{18})^{12-}$ ions forming a ring with the Si—O tetrahedral bodies connected to each other sharing two corners.

Moreover, the linear silicate is a silicate compound having a structure, in which the Si—O tetrahedral bodies are connected to each other sharing two corners, and the cations are located to neutralize $(Si_2O_6)_\infty CO^{4-}$ ions formed by this chain.

Among the above-mentioned independent silicates, forsterite, fayalite, tephroite, knebelite or monticellite, which has the olivine structure, is preferably used from the viewpoint of the superior $SF_6$-gas resistance and the superior mechanical strength (because of containing no alkali metal that might decrease a reduction in the electric insulating property due to ion dissociation caused by hydrofluoric acid corrosion). Moreover, zircon is also preferably used from the viewpoint of a low thermal expansion, high electric insulating property and superior arc resistance.

Moreover, among the cyclic silicates, cordierite is preferably used from the viewpoint that it has superior $SF_6$-gas resistance and mechanical strength and does not contain toxic Be.

Moreover, among the linear silicates, wollastonite belonging to the pyroxene group is preferably used from the viewpoint that it has superior $SF_6$-gas resistance, mechanical strength and cracking resistance.

As a silicate compound containing MgO and $SiO_2$ as a main component, examples thereof are Olivine ($(Mg, Fe)_2SiO_4$), Forsterite ($2MgO.SiO_2$), Clinoenstatite ($MgO.SiO_2$), Enstatite ($MgO.SiO_2$), Steatite ($MgO.SiO_2$), Chrysotile ($3MgO.2SiO_2.2H_2O$), Talc ($3MgO.4SiO_2.H_2O$), Cordierite ($2MgO.2Al_2O_35SiO_2$), Pyrope ($3MgO.Al_2O_3.3SiO_2$), Sapphirine ($4MgO.5Al_2O_3.2SiO_2$), and the like.

As a silicate compound containing CaO and $SiO_2$ as a main component, examples thereof are Wollastonite ($CaO.SiO_2$), Larnite ($2CaO.SiO_2$), Rankinite ($3CaO.2SiO_2$), Anorthite ($CaO.Al_2O_3.2SiO_2$), Gehlenite ($2CaO.Al_2O_3.SiO_2$), Grossuralite (Garnet) ($3CaO.Al_2O_3.3SiO_2$), Danburite ($CaO.B_2O_3.2SiO_2$), Hedenbergite ($CaO.FeO.2SiO_2$), Nagelschmidtite ($7CaO.P_2O_5.2SiO_2$), Silicocarnotite ($5CaO.P_2O_5.SiO_2$), Titanite ($CaO.TiO_2.SiO_2$), and the like.

Moreover, as a silicate compound containing CaO, MgO and $SiO_2$ as a main component, examples thereof are Monticellite ($CaO.MgO.SiO_2$), Akermanite $2CaO.MgO.2SiO_2$), Diopside ($CaO.MgO.2SiO_2$), Merwinite ($MgO.3CaO.2SiO_2$), and the like.

Among the silicate compounds, Forsterite, Monticellite, Wollastonite, or Steatite is preferably used from the viewpoint of the superior $SF_6$-gas resistance and mechanical strength and low dielectric constant.

As a silicate compounds containing MgO and $SiO_2$ as a main components, an amount of MgO is preferably 16 to 94% by weight in the composition from the viewpoint of superior $SF_6$-gas resistance and mechanical strength. In particular, from the viewpoint of superior $SF_6$-gas resistance and mechanical strength as well as low dielectric constant, the amount of MgO is preferably 20 to 80% by weight in the composition.

As the silicate compounds containing CaO and $SiO_2$ as a main component, an amount of CaO is preferably 20 to 90% by weight from the viewpoint of superior $SF_6$-gas resistance and mechanical strength. In particular, the amount of CaO is preferably 30 to 70% by weight in the composition from the viewpoint of superior $SF_6$-gas resistance and mechanical strength as well as low dielectric constant.

As the silicate compounds containing CaO, MgO and $SiO_2$ as a main component, a total amount of the MgO and CaO components is preferably 20 to 90% by weight in the composition from the viewpoint of superior $SF_6$-gas resistance and mechanical strength. In particular, the total amount of the MgO and CaO components is preferably 25 to 70% by weight in the composition from the viewpoint of superior $SF_6$-gas resistance and mechanical strength as well as low dielectric constant.

As shape of the silicate powder of the present invention, examples thereof are fine particles, needle-shaped substrates, plate-like substrates, balloons, beads and the like. Among those, the fine particles or the needle-shaped substrate is preferably used from the viewpoint of proper molding property, mechanical strength and cracking resistance.

Moreover, in case of fine particles, the average particle diameter is preferably at most 100 $\mu$m from the viewpoint that the average particle diameter exceeding 100 $\mu$m decreases the mechanical strength of the molded article. Moreover, it is more preferably 0.5 to 50 $\mu$m from the viewpoint of proper balance between the fluidity and the mechanical strength.

Furthermore, in case of needle-shaped substrates, an average fiber diameter is preferably at most 100 $\mu$m and an aspect ratio thereof is preferably at most 100. From the viewpoint of proper viscosity of the resin composition at molding, the average fiber diameter is more preferably at most 30 $\mu$m and the aspect ratio is more preferably at most 80. The average fiber diameter is normally at least 0.1 $\mu$m.

In the present invention, a blending ratio of the silicate powder can be suitably selected by a person skilled in the art from the range in which the target molded product is obtained. But in order to achieve proper mechanical strength and cracking resistance and to simultaneously prevent degradation in the molding property, it is preferably 20 to 80 parts by volume in the resin composition. Moreover, from the viewpoint of proper balance between the fluidity and the mechanical strength, it is more preferably 30 to 70 parts by volume in the resin composition.

Moreover, the epoxy resin composition for an $SF_6$-gas insulating device of the present invention may contain inorganic powder other than the above-mentioned silicate compound. The resulting advantages are improvements of the mechanical strength and cracking resistance in the obtained molded article.

As the inorganic compound other than the silicate compound, any material that is generally used as a filler for a resin composition may be used. Examples thereof are fused silica, crystalline silica, alumina, alumina hydrate, hollow glass beads, glass fiber, magnesium oxide, titanium oxide, calcium carbonate, magnesium carbonate, dolomite, talc, potassium titanate fiber, calcium hydroxide, magnesium hydroxide, antimony trioxide, gypsum anhydride, barium sulfate, boron nitride, silicon carbide, aluminum fluoride, calcium fluoride, magnesium fluoride, aluminum borate, and the like. These may be used solely or in a combination use of two or more thereof.

As the shape of these inorganic powders other than the silicate compound, the average particle diameter of fine particles, the average fiber diameter of needle-shaped substrate and the aspect ratio, these may be the same as those of the silicate powder.

However, when any inorganic compound other than the silicate compound is blended, consideration should be given so that it is blended within a range that does not increase the dielectric constant of the molded article obtained from the epoxy resin composition for an $SF_6$-gas insulating device of the present invention. The specific blending ratio of the powder other than the silicate compound is preferably 3 to 90 parts by volume based on the entire inorganic filler containing the silicate compound. From the viewpoint of proper balance of the mechanical strength, cracking resistance and molding property, it is more preferably 5 to 70 parts by volume based on the entire inorganic filler including the silicate compound.

Next, the epoxy resin composition for an $SF_6$-gas insulating device of the present invention may contain a curing agent, which reacts with the epoxy resin and sets it. As the curing agent, there is no particular limitation for it as long as it is generally used for a composition comprising an epoxy resin. Examples thereof are acid anhydrides such as phthalic anhydride, hexahydrophthalic anhydride, methyl nadic anhydride, dodecyl succinic anhydride, trimellitic anhydride, pyromellitic anhydride, tetrahydrophthalic anhydride and methyltetrahydrphthalic anhydride; amines such as triethylenetetramine, bis(4-aminophenyl)methane, bis(3-aminophenyl)methane, bis(4-aminophenyl)sulfone, 1,4-phenylenediamine, 1,4-naphthalenediamine, benzyldimethylamine, 1,5-naphthalenediamine and dicyandiamide; polyhydric phenol compounds such as bisphenol-A, bisphenol-F, bisphenol-S, a phenol novolak resin and a p-hydroxystyrene resin; imidazole compounds such as 2-methylimidazole, 2-ethylimidazole and 2-ethyl-4-methylimidazole. These may be used solely or in a combination use of two or more thereof.

Among these curing agents, from the viewpoint of long pot life and small heat generation at setting, it is preferable to use acid anhydrides such as phthalic anhydride, hexahydrophthalic anhydride, methyl nadic anhydride, dodecyl succinic anhydride, trimellitic anhydride, pyromellitic anhydride, tetrahydrophthalic anhydride and methyltetrahydrophthalic anhydride.

A blending ratio of the curing agent is a range similar to the amount in a conventional epoxy resin composition. However, it is preferably 40 to 140% based on the stoichiometric amount of the epoxy resin from the viewpoint of proper molding property. Moreover, from the viewpoint of proper balance between the heat resistance and the mechanical strength of the obtained molded article, it is more preferably 60 to 120% based on stoichiometric amount of the epoxy resin.

Moreover, the epoxy resin composition for an $SF_6$-gas insulating device of the present invention also contains a curring accelerator for accelerating chemical reaction between the epoxy resin and the curing agent.

As the curing accelerator, there is no particular limitation for it, as long as it is generally used as a catalyst for reaction between an epoxy resin and the curing agent. Examples thereof are organic phosphoric compounds such as triphenylphosfine and triphenylphosphite; imidazoles such as 2-methylimidazole, 2-phenylimidazole, 2-undecylimidazole, 2-heptadecylimidazole, 2-ethylimidazole, and 2-ethyl-4-methylimidazole; tertiary amines such as 2-(dimethylaminomethyl)phenol, 2,4,6-tris (dimethylaminomethyl)phenol, benzyldimethylamine and α-methylbenzylmethylamine; organic acid salts such as 1,8-diazabicyclo(5,4,0)undecene-7; and quaternary ammonium salts such as tetraethylammonium bromide, benzyltriethylammonium chloride and benzyltri-n-butylammonium bromide; and the like. These materials may be used solely or in a combination use of two or more thereof.

A blending ratio of the above-mentioned curing accelerator, there is no particular limitation for it, as long as it is in the range in which it exerts effects as the accelerator and does not give adverse effects on the stability in preservation. It is preferably 0.01 to 20 parts by weight based on 100 parts by weight of the epoxy resin.

Furthermore, in order to reduce the dielectric constant and to improve the mechanical strength and cracking resistance of the obtained molded article, the epoxy resin composition for an $SF_6$-gas insulating device of the present invention may contain an organic powder or fiber having a glass transition temperature of at least 140° C. and a linear expansion coefficient of at most 40 ppm/° C. at a temperature of not more than the glass transition temperature. Such an organic powder or fiber makes it possible to realize a reduction in the thermal expansion coefficient and an improvement of the heat resistance of the organic component excluding the inorganic filler such as a silicate compound, as well as a reduction in the amount of the filler and the subsequent reduction in the dielectric constant of the obtained molded article.

The above organic material having the glass transition temperature of at least 140° C. and the linear expansion coefficient of at least 40 ppm/° C. at a temperature of at most the glass transition temperature is required because the glass transition temperature of less than 140° C. decreases the heat resistance of the obtained molded article and the subsequent degradation in the reliability for long service, and because the linear expansion coefficient exceeding 40 ppm/° C. increases the thermal expansion coefficient in the obtained molded article, and the subsequent occurrence of cracks. The glass transition temperature and the linear expansion coefficient are inherent values in each organic material. Examples of these materials satisfying the above-mentioned requirements and preferably used in the present invention are polyimide, poly(amideimide), polysulfone, poly (phenylether), poly(benzimidazole), aramide, poly (paraphenylenebenzobisoxazole) and the like. These materials may be used solely or in a combination use of two or more thereof.

Moreover, from the viewpoint of a reduction in the expansion coefficient and a high heat resistance of the molded article, those materials having a glass transition temperature of at least 200° C. and a linear expansion coefficient of at most 35 ppm/° C. are preferably used. Examples satisfying these requirements are polyimide, poly (amideimide), poly(benzimidazole), aramide, poly (paraphenylenebenzobisoxazole) and the like.

The organic powder is preferably formed into the shape of particles, and the average particle diameter is preferably within a range improving the mechanical strength and the cracking resistance without impairing the molding property, for example, in the range of 0.1 to 100 μm. Moreover, in case of the organic fiber, the average fiber diameter is preferably within a range that does not cause an increase in viscosity of the resin composition at molding, for example, in the range of at most 100 μm.

The blending ratio at blending the organic powder or fiber, it may be within a range that at least provides the obtained molded article. In order to improve the mechanical strength and the cracking resistance of the molded article without impairing the molding property, it is preferably 1 to 90% by volume based on the total amount of the organic powder or fiber and the inorganic filler. Moreover, from the viewpoint of proper balance between the molding property and the mechanical strength and cracking resistance of the molded article, it is more preferably 3 to 70% by volume based on the total amount of the organic powder or fiber and the inorganic filler.

To the epoxy resin composition for an $SF_6$-gas insulating device of the present invention, there may be added the following additives, as long as an amount thereof is in a range that does not impair the effects of the present invention. Examples thereof are a coupling agent belonging to silane, titanium, or aluminum group; a flexibilizer such as an acrylic rubber, a butadiene rubber, a nitrile rubber or a styrene rubber; a modifier, a colorant, a pigment, an anti-oxidant agent, an inner mold-releasing agent, and a surfactant.

A blending ratio at blending the coupling agent may be suitably selected by a person skilled in the art. From the viewpoint of an improvement in the bonding property of the resin composition and the filler, it is preferably 0.1 to 20 parts by weight based on 100 parts by weight of the filler.

Moreover, a blending ratio at blending the flexibilizer may be suitably set by a person skilled in the art. From the viewpoint of proper balance between the molding property and the cracking resistance of the molded article, it is preferably 1 to 40 parts by weight based on 100 parts by weight of the epoxy resin.

The epoxy resin composition for an $SF_6$-gas insulating device of the present invention is prepared by mixing the above-mentioned components by means of the conventional method.

Moreover, the epoxy resin composition for an $SF_6$-gas insulating device of the present invention can be formed into a molded article by means of the conventional method such as a mold-injecting method. Namely, the present invention also relates to the molded article.

The obtained molded article has superior mechanical property and thermal resistance with a low dielectric constant, and is superior in the $SF_6$-gas resistance in spite of the composition containing an $SiO_2$ component. The article can be preferably applied to an insulating member such as an insulating support member and an insulating spacer between electric members, used for a switching device of an $SF_6$-gas insulating device, an inner-gas-duct power transmitting device and other electric apparatuses.

EXAMPLES

The present invention is then explained in detail by means of examples and comparative examples, and the present invention is not limited to these examples. In Examples "parts" and "%" mean "parts by weight" and "% by weight" respectively unless otherwise specified.

Table 1 shows components used in Examples 1 to 15.

TABLE 1

| | |
|---|---|
| Epoxy Resin | Epikote 828 available from Yuka Shell Epoxy K. K. (Bisphenol A diglycidyl-ether) |
| Curing Agent | HN2200 available from Hitachi Chemical Co., Ltd. (Methyl tetrahydrophthalic anhydride) |
| Curing Accelerator | Epikure IBMI-12 available from Yuka Shell Epoxy K. K. (1-isobutyl-2-methylimidazole) |
| Silicate Powder | |
| Independent Silicate | |
| Olivine Structure | |
| Forsterite | |
| a | Raw talc and magnesium hydroxide were baked and sized with a sieve (average particle diameter of about 3 μm) |
| b | Raw talc and magnesium hydroxide were baked and sized with a sieve (average particle diameter of about 18 μm) |
| c | Raw talc and magnesium hydroxide were baked and sized with a sieve (average particle diameter of about 42 μm) |
| d | Raw talc and magnesium hydroxide were baked and sized with a sieve (average particle diameter of about 83 μm) |
| e | Raw talc and magnesium hydroxide were baked and sized with a sieve (average particle diameter of about 129 μm) |
| Fayalite | Average particle diameter of about 19 μm |
| Tephroite | Average particle diameter of about 27 μm |
| Knebelite | Average particle diameter of about 27 μm |
| Monticellite | Average particle diameter of about 65 μm |
| Zircon | A-PAX available from Kinseimatech K. K. (average particle diameter of about 1 μm) |
| Cyclic Silicate | |
| Cordierite | SS-400 available from Kinseimatech K. K. (average particle diameter of about 12 μm) |
| Linear Silicate | |
| Wollastonite | FPW-400 available from Kinseimatech K. K. (average particle diameter of about 9 μm) |
| Solid Network Silicate | |
| Sanidine | OF-P available from Kinseimatech K. K. (average particle diameter of about 8 μm) |
| Inorganic Powder | |
| Alumina | AS-20 available from Showa Denko K. K. (average particle diameter of about 22 μm) |
| Aluminium Fluoride | SS-AlF3 available from Morita Chemical Industries, K. K. was grinded and sized with a sieve (average particle diameter of about 5 μm) |
| Fused Silica | RD-8 available from Tatumori K. K. (average particle diameter of about 13 μm) |
| Organic Powder | |
| Heat Resistant Polyimide | UIP-S available from Ube Industries, Ltd. (average particle diameter of about 10 μm), Tg = about 500° C., α1 = 25 ppm/° C. |

TABLE 1-continued

| | |
|---|---|
| Polyamideimide | TORLON available from Teijin Amoco Engineering Plastic K. K. was sized with a sieve (average particle diameter of about 75 μm), Tg = 278° C., α1 = 31 ppm/° C. |

Examples 1 to 11

According to the blending ratio (% by volume) shown in Table 2, components other than a silicate powder and a curing accelerator were mixed for 10 minutes at a room temperature under an atmospheric pressure by using a kneading machine. To the obtained mixture was added the silicate powder, and the mixture was mixed for one hour at a room temperature under an atmospheric pressure. To the mixture was further added a curing accelerator and the mixture was further mixed for 10 minutes at a room temperature under vacuum to obtain epoxy resin compositions 1 to 11 for an $SF_6$-gas insulating device of the present invention.

The obtained resin compositions 1 to 11 were injected into an injection mold made of glass. After heating and molded at 130° C. for six hours in a high-temperature bath, this was further heated and molded at 150° C. for six hours to obtain plate-shaped molded articles 1 to 11 (3 mm in thickness).

$SF_6$-gas resistance, dielectric constant, flexural strength and cracking resistance of the obtained resin compositions were evaluated by the following methods.

[Measuring Methods]

(1) $SF_6$-gas Resistance

After electrodes was attached to the plate-shaped molded article thus obtained, this was placed in a tank filled with a mixed gas of $SF_6$-gas and HF gas ($SF_6$ gas: HF gas=100:0.5 (volume ratio)), and DC voltage of 500 V was induced to this, and a current value (A) was measured at 1 minute after the voltage inducing. The surface resistance having at least $10^{15}\Omega$ was evaluated as O, the surface resistance having at least $10^{14}\Omega$ to less than $10^{15}\Omega$ was evaluated as Δ, and the surface resistance having less than $10^{14}\Omega$ was evaluated as ×.

(2) Dielectric Constant

After electrodes was attached to the plate-shaped molded article thus obtained, this was connected to a dielectric constant measuring circuit, and DC voltage of 500 V was applied to this, and a dielectric constant (60 Hz) was measured at 1 minute after the voltage inducing.

(3) Flexural Strength

Flexural strength (kgf/mm$^2$) of the obtained plate-shaped molded article was measured by using a three-point bending method according to JIS-K6911.

(4) Glass Transition Temperature

The glass transition temperature Tg (° C.) of the resulting plate-shaped molded product was measured by means of thermal machine analysis. Based upon curves of the thermal expansion coefficient, Tg was found from an intersection between extension lines of the linear portion of the glass area and the linear portion of the rubber area of the molded product.

(5) Cracking Resistance

Figure 1B:
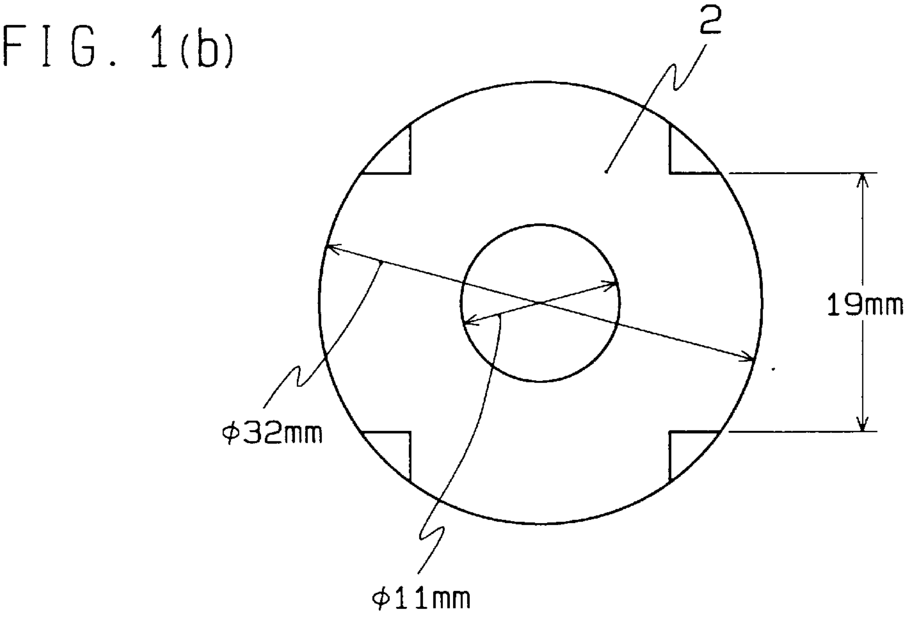
Figure 1C:
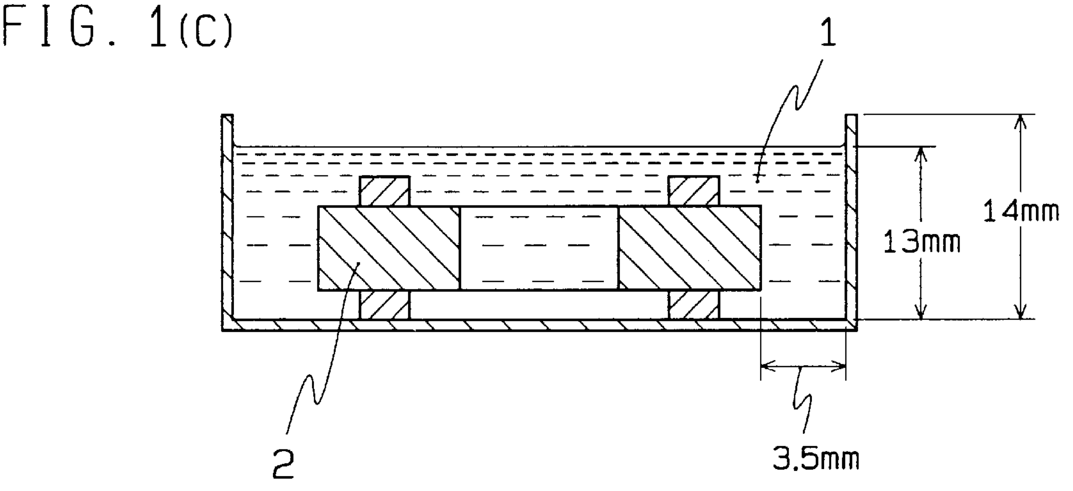

Cracking resistance was evaluated according to a method described in Publication 455-2(Part 2) of the IEC standard. As an olyphant-washer, an aluminum olyphant-washer was used. FIG. 1 is a schematic drawing explaining the present test. FIG. 1(*a*) and 1(*b*) are schematic explanatory drawings showing the shape of the olyphant-washer used in the present test. FIG. 1(*c*) is a schematic explanatory drawing showing a specimen formed by embedding an olyphant-washer in the resin composition. As illustrated in FIG. 1(*c*), the specimen embedded in the resin composition to be tested was used. In FIG. 1, 1 represents an olyphant-washer, and 2 is the resin composition. After the composition is set, the specimen is alternately exposed to a high temperature and a low temperature, while thermal impacts are applied thereto, starting with weak ones, with the temperature gap being successively widened. At the time of crack occurrence, the crack resistance is indicated by a crack index. An oven is used at the high-temperature side (for 30 minutes in an air) and a dry ice alcohol solution is used at the low-temperature side (for 10 minutes in a liquid). At least three specimens are used and the cracking resistance is evaluated by arithmetically averaging the respective crack indexes according to Table 3.

conventional resin molded articles using alumina fillers. Moreover, the resin molded articles in Examples 1 to 11 exhibits a superior $SF_6$-gas resistance to those using the silica filler in Comparative Example 2. In particular, in case of independent silicates, the resin molded articles (Examples 1 to 5) filled with silicate powder having the olivine structure, or the resin molded articlets (Examples 9 and 10) filled with mixed fillers thereof, showed the $SF_6$-gas resistance as the alumina filler, and in spite that they contained silicate components in the composition, they exhibited superior properties. But the $SF_6$-gas resistance of the potassium feldspar (Comparative Example 3) belonging to the stereo-network silicates having the same three-dimensional structure as silica was the same level as silica. The cracking resistance of the molded articles in Examples 1 to 1 1 showed a value higher than that of the alumina filler; and in particular, zircon (Example 6) belonging to the independent

TABLE 2

| | Example | | | | | | | | | | | Comparative Example | | |
|---|---|---|---|---|---|---|---|---|---|---|---|---|---|---|
| | 1 | 2 | 3 | 4 | 5 | 6 | 7 | 8 | 9 | 10 | 11 | 1 | 2 | 3 |
| Ingredients (% by volume) | | | | | | | | | | | | | | |
| Epoxy Resin | 28.6 | 28.6 | 28.6 | 28.6 | 28.6 | 28.6 | 17.2 | 34.3 | 31.5 | 28.6 | 25.1 | 28.6 | 28.6 | 28.6 |
| Curing agent | 21.2 | 21.2 | 21.2 | 21.2 | 21.2 | 21.2 | 12.7 | 25.5 | 23.4 | 21.2 | 19.1 | 21.2 | 21.2 | 21.2 |
| Curing Accelerator | 0.2 | 0.2 | 0.2 | 0.2 | 0.2 | 0.2 | 0.1 | 0.2 | 0.2 | 0.2 | 0.1 | 0.2 | 0.2 | 0.2 |
| Silicate Powder | | | | | | | | | | | | | | |
| Independent Silicate | | | | | | | | | | | | | | |
| Olivine Structure | | | | | | | | | | | | | | |
| Forsterite a | 50.0 | — | — | — | — | — | — | — | — | — | — | — | — | — |
| Fayalite | — | 50.0 | — | — | — | — | — | — | — | — | — | — | — | — |
| Tephroite | — | — | 50.0 | — | — | — | — | — | — | — | — | — | — | — |
| Knebelite | — | — | — | 50.0 | — | — | — | — | — | — | — | — | — | — |
| Monticellite | — | — | — | — | 50.0 | — | — | — | — | — | — | — | — | — |
| Zircon | — | — | — | — | — | 50.0 | — | — | — | — | — | — | — | |
| Cyclic Silicate | | | | | | | | | | | | | | |
| Cordierite | — | — | — | — | — | — | 70.0 | — | — | — | — | — | — | — |
| Linear Silicate | | | | | | | | | | | | | | |
| Wollastonite | — | — | | — | — | — | — | 40.0 | 5.0 | — | — | — | — | — |
| Solid Network Silicate | | | | | | | | | | | | | | |
| Sanidine | — | — | — | — | — | — | — | — | — | — | — | — | — | 50.0 |
| Inorganic Powder | | | | | | | | | | | | | | |
| Alumina | — | — | — | — | — | — | — | — | — | — | 20.0 | 50.0 | — | — |
| Aluminium Fluoride | — | — | — | — | — | — | — | — | 10.0 | 10.0 | — | — | — | — |
| Fused Silica | — | — | — | — | — | — | — | — | — | — | — | — | 50.0 | — |
| Organic Powder | | | | | | | | | | | | | | |
| Heat Resistant Polyimide | — | — | — | — | — | — | — | — | — | 20.0 | — | — | — | — |
| Polyamideimide | — | — | — | — | — | — | — | — | — | — | 35.0 | — | — | — |
| Results | | | | | | | | | | | | | | |
| Glass Transition Temperature Tg (° C.) | 134.3 | 133.6 | 133.2 | 135.1 | 132.9 | 130.1 | 133.5 | 134.3 | 133.1 | 134.7 | 132.8 | 130.2 | 133.0 | 132.4 |
| Dielectric Constant (60 Hz) | 4.9 | 5.2 | 5.1 | 5.2 | 4.8 | 6.2 | 4.7 | 5.0 | 4.7 | 4.2 | 4.3 | 6.5 | 4.6 | 5.1 |
| Flexural Strength ($kgf/mm^2$) | 12.5 | 12.3 | 10.7 | 11.3 | 10.6 | 16.9 | 15.5 | 14.2 | 14.0 | 11.8 | 10.9 | 10.7 | 13.1 | 11.6 |
| $SF_6$-gas resistance | ○ | ○ | ○ | ○ | ○ | Δ | Δ | ○ | ○ | ○ | ○ | ○ | x | x |
| Cracking resistance | 12 | 11 | 10 | 13 | 11 | 18 | 16 | 14 | 15 | 10 | 11 | 10 | 0 | 11 |

From the results shown in Table 2, it was shown that all the dielectric constants of the resin molded articles in Examples 1 to 11 had values lower than that of the alumina filler in Comparative Example 1, and that they are more effective in reducing dielectric constant as compared with silicates had a low thermal expansion property so that it showed a higher value than the others. Wollastonite (Example 8) belonging to the linear silicates showed a high cracking resistance, even if a filling amount thereof into the resin composition was low. Moreover, the flexural strength and the glass transition temperature (Tg) of the resin molded articles in Examples 1 to 11 showed values identical to, or higher than those of the alumina filler, and they were also superior in the mechanical property and heat resistance.

TABLE 3

| Crack Index | Test Condition |
|---|---|
| 0 | Crack of curing material propagates as it is. |
| 1 | Crack propagates at 105° C. → 0° C. |
| 2 | Crack propagates at 105° C. → 0° C. |
| 3 | Crack propagates at 105° C. → 0° C. |
| 4 | Crack propagates at 105° C. → −15° C. |
| 5 | Crack propagates at 105° C. → −15° C. |
| 6 | Crack propagates at 105° C. → −15° C. |
| 7–9 | Crack propagates at 105° C. → −30° C. |
| 10–12 | Crack propagates at 105° C. → −45° C. |
| 13–15 | Crack propagates at 105° C. → −60° C. |
| 16–18 | Crack propagates at 120° C. → −60° C. |
| 19–21 | Crack propagates at 135° C. → −60° C. |
| 22–24 | Crack propagates at 150° C. → −60° C. |
| 25–27 | Crack propagates at 165° C. → −60° C. |
| 28–30 | Crack propagates at 180° C. → −60° C. |

Examples 12 to 15

Except that forsterite having an average particle diameter shown in Table 4 was used as the silicate powder, epoxy resin compositions 12 to 15 for an $SF_6$-gas insulating device and plate-shaped molded articles 12 to 15 of the present invention were prepared and evaluated in the same manner as Example 1. Table 4 shows the results thereof.

Comparative Examples 1 to 3

Except that a blending ratio was changed to that shown in Table 4, comparative resin compositions 1 to 3, comparative molded articles 1 to 3 were prepared and evaluated in the same manner as Example 1. Tables 2 and 4 show the results thereof.

TABLE 4

| | Example | | | | | Comparative Example | |
|---|---|---|---|---|---|---|---|
| | 1 | 12 | 13 | 14 | 15 | 1 | 2 |
| Ingredients (% by volume) | | | | | | | |
| Epoxy Resin | 28.6 | 28.6 | 28.6 | 28.6 | 28.6 | 28.6 | 28.6 |
| Curing Agent | 21.2 | 21.2 | 21.2 | 21.2 | 21.2 | 21.2 | 21.2 |
| Curing Accelerator | 0.2 | 0.2 | 0.2 | 0.2 | 0.2 | 0.2 | 0.2 |
| Silicate Powder | | | | | | | |
| Forsterite | | | | | | | |
| a. Average particle diameter of 3 μm | 50.0 | | | | | | |
| b. Average particle diameter of 18 μm | | 50.0 | | | | | |
| c. Average particle diameter of 42 μm | | | 50.0 | | | | |
| d. Average particle diameter of 83 μm | | | | 50.0 | | | |
| e. Average particle diameter of 129 μm | | | | | 50.0 | | |
| Inorganic Powder | | | | | | | |
| Alumina (25 μm) | | | | | | 50.0 | |
| Fused Silica (48 μm) | | | | | | | 50.0 |

TABLE 4-continued

| | Example | | | | | Comparative Example | |
|---|---|---|---|---|---|---|---|
| | 1 | 12 | 13 | 14 | 15 | 1 | 2 |
| Results | | | | | | | |
| Glass Transition Temperature Tg (° C.) | 134.3 | 134.7 | 134.1 | 133.2 | 134.3 | 130.2 | 133.0 |
| Dielectric Constant (60 Hz) | 4.9 | 4.9 | 4.9 | 4.9 | 4.9 | 6.5 | 4.6 |
| Flexural Strength (kgf/mm$^2$) | 12.5 | 13.0 | 11.9 | 10.9 | 9.1 | 10.7 | 13.1 |
| $SF_6$-Gas resistance | ○ | ○ | ○ | ○ | ○ | ○ | x |
| Cracking resistance | 12 | 13 | 13 | 12 | 10 | 10 | 20 |

From the results shown in Table 4 it was confirmed that the dielectric constant of the resin molded articles in Examples 1 and 12 to 15 showed a lower value than that of the alumina filler in Comparative Example 1 and that they were more effective in reducing the dielectric constant as compared with conventional resin molded articles using the alumina filler. The $SF_6$-gas resistance of these examples was superior to that of the silica filler in Comparative Example 2. Moreover, the cracking resistance and the glass transition temperature (Tg) of the resin molded articles in Examples 1 and 12 to 15 showed values identical to, or higher than those of the alumina filler in Comparative Example 1. Therefore, it was confirmed that the particle diameter of the filler did not give any effects on these properties.

Figure 2:
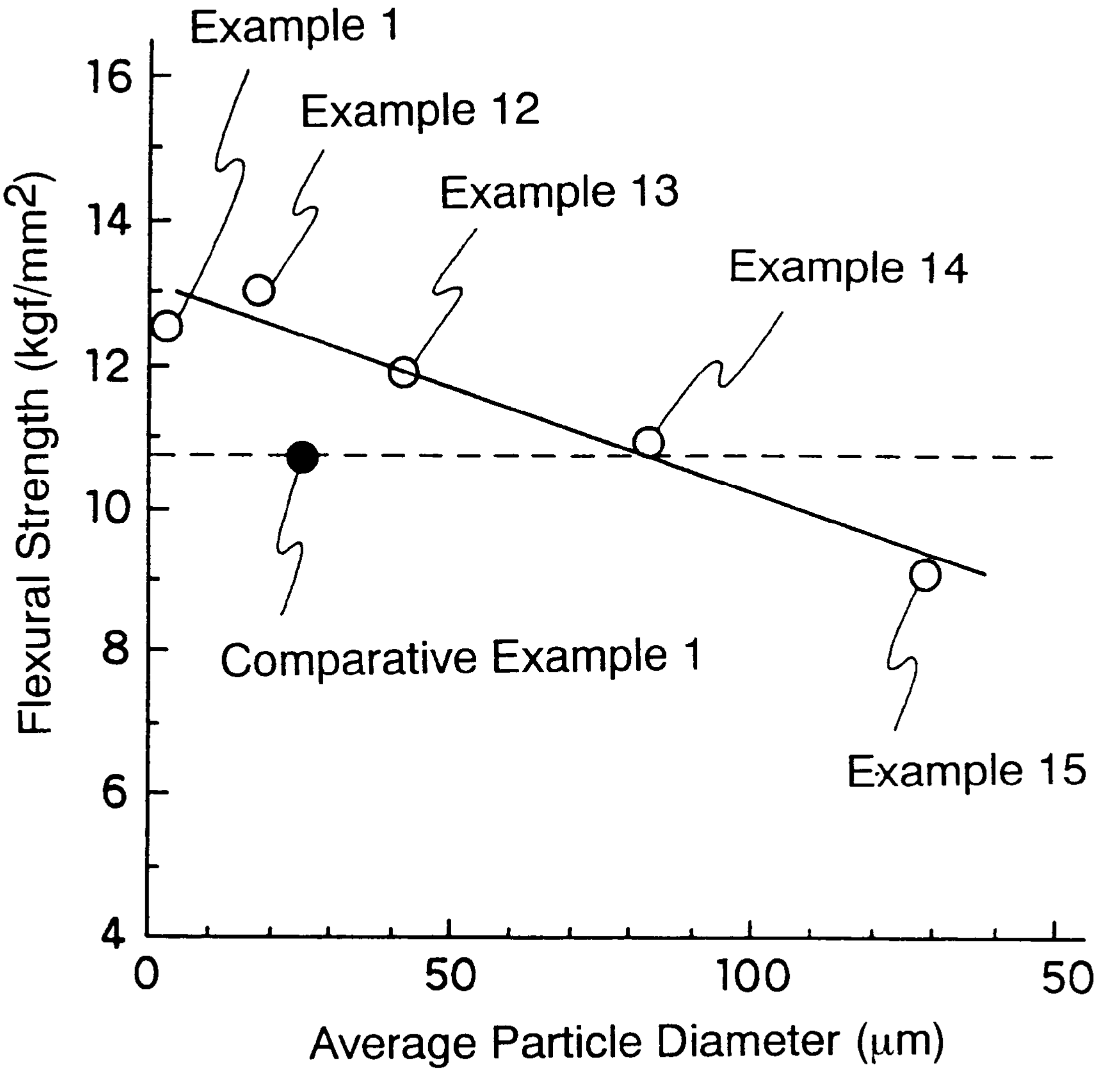
FIG. 2 is a graph showing the relationship between the average particle diameter of a silicate powder and the flexural strength of the obtained molded article.

Based on the results in Examples 1 and 12 to 15 as well as Comparative Example 1, FIG. 2 shows the relationship between the average particle diameter (μm) of the silicate powder (forsterite) and the flexural strength (kgf/mm$^2$) of the obtained plate-shaped molded articles.

FIG. 2 shows that the smaller the average particle diameter is, the greater the flexural strength of the molded articles becomes. When the average particle diameter approaches to 100 μm, the flexural strength becomes virtually the same as the value of conventional articles using alumina shown in Comparative Example 1. When it becomes at least 100 μm, the flexural strength becomes low compared with the value of the conventional articles. This confirms that the particle diameter of the silicate powder is preferably 0.5 to 100 μm.

Examples 1 to 3

At measuring the $SF_6$-gas resistance in Examples 1 to 15 and Comparative Examples 1 to 3, after inducing DC voltage of 500 V, the exposing time during which the plate-shaped molded article was exposed to a mixed gas of an $SF_6$-gas and an HF gas was successively varied from 0 minute, 10 minutes, 20 minutes, 30 minutes, 40 minutes, 60 minutes, 180 minutes to 300 minutes. Then, while the voltage was maintained, a surface resistance (Ω) of the plate-shaped molded article at the respective exposing time was measured according to JIS-K6911. The smaller the variation in the surface resistance becomes, the more excellent the $SF_6$-gas resistance becomes.

Figure 3:
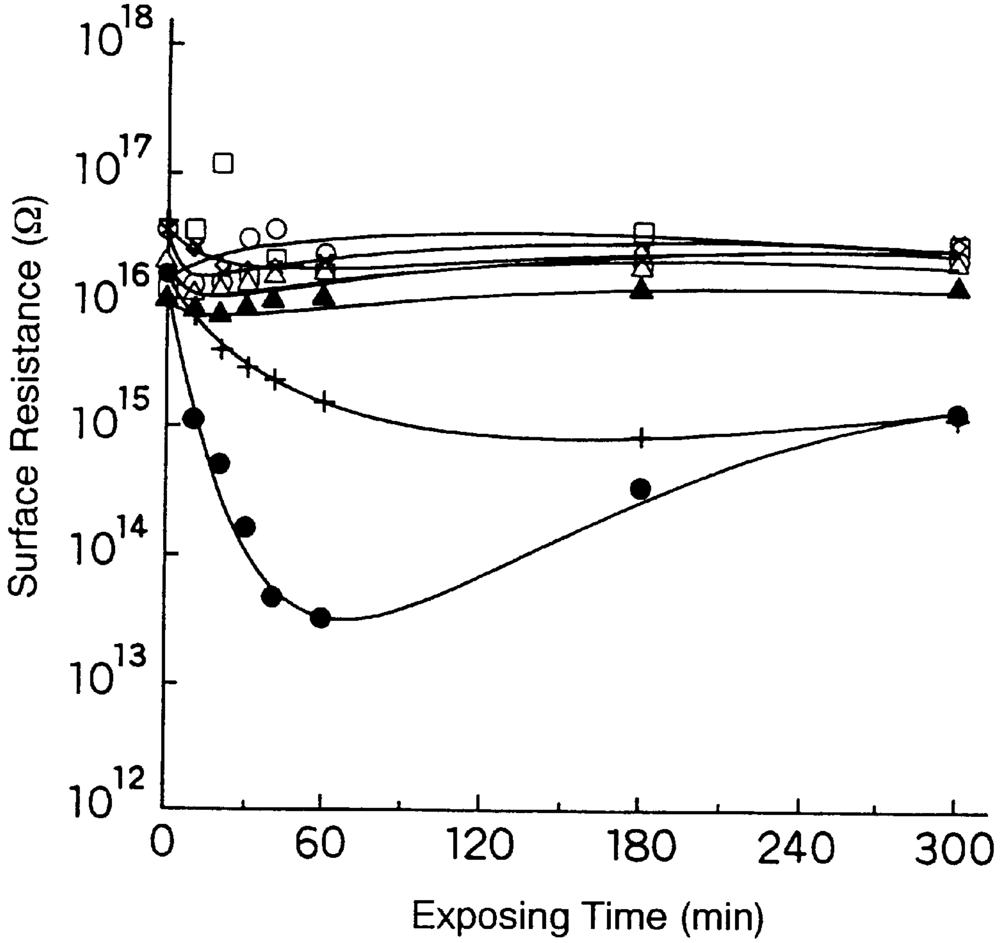
FIG. 3 is a graph showing the relationship between the exposing time to a mixed gas and the surface resistance of the molded article using an independent silicate as the silicate compound.
Figure 4:
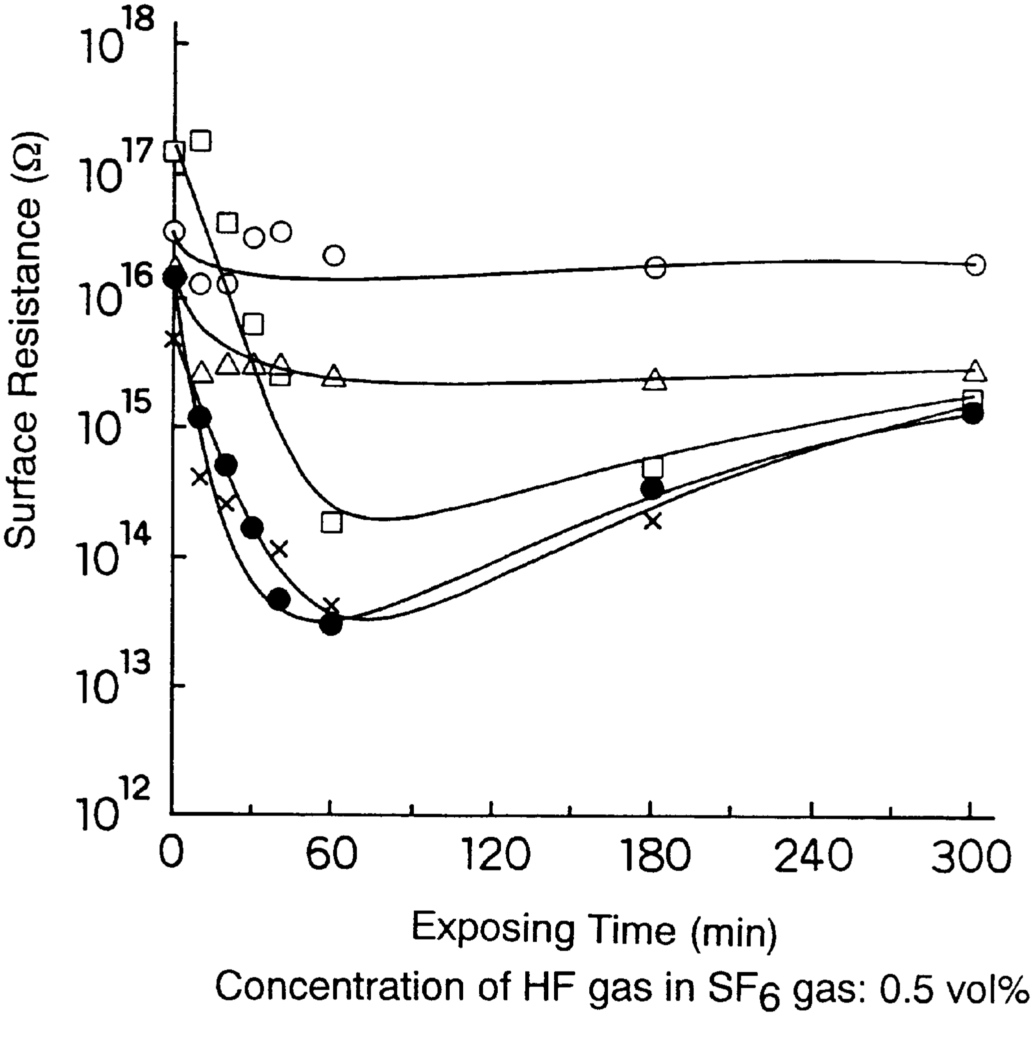
FIG. 4 is a graph showing the relationship between the exposing time to a mixed gas and the surface resistance of the molded article using a cyclic silicate or a linear silicate as the silicate compound.
Figure 5:
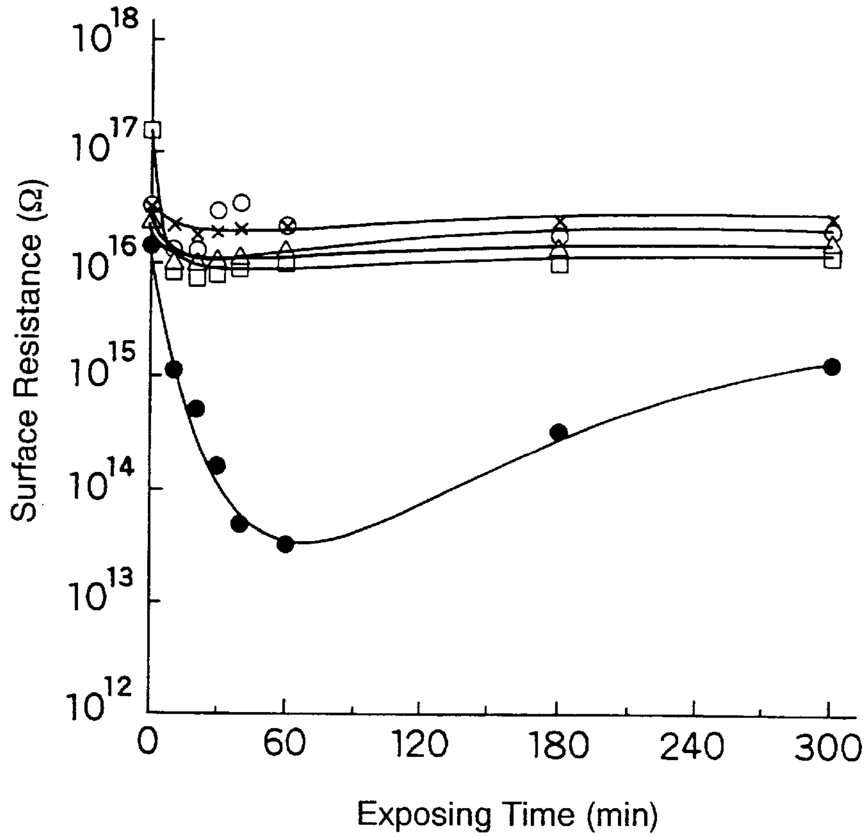
FIG. 5 is a graph showing the relationship between the exposing time to a mixed gas and the surface resistance of the molded article using an organic material.

Experimental Example 1 using independent silicates corresponding to Examples 1 to 6, Experimental Example 2 using cyclic and linear silicates corresponding to Examples 7 and 8, and Experimental Example 3 using organic materials corresponding to Examples 9 to 11 were carried out, and FIGS. 3 to 5 show the results thereof. FIGS. 3 to 5 show the relationship between the exposing time to the mixed gas of $SF_6$ HF gas and the surface resistance.

FIG. 3 shows that in case of the silica ($SiO_2$) filler in Comparative Example 2, the surface resistance drops greatly immediately after gas injection from $10^{16}\Omega$ to $10^{13}\Omega$. In contrast to this, in case of the molded articles filled with independent silicates having the olivine structure of Examples 1 to 5, the value drops on injection of gas, but it is maintained at $10^{15}\Omega$, that is, a value virtually equal to that of the conventional articles using alumina, so that the ratio of the drop is smaller than that of the case using the silica filler. As mentioned-above, it was confirmed that the molded article obtained by filling the independent silicate powder exhibits a superior $SF_6$-gas resistance, even if it contains $SiO_2$ in its composition.

FIG. 4 shows that in case of the molded article using the cyclic silicate (cordierite) powder in Example 7, the surface resistance starts dropping immediately after gas injection, the value is maintained at a relatively high value, $10^{14}\Omega$at a minimum point, as compared with the case using the silica filler. In case of the molded article using the linear silicate (wollastonite) powder, when it was exposed to the $SF_6$/HF mixed gas, the surface resistance is maintained at a level with only a slight drop.

Consequently, it is confirmed that the molded articles using an independent silicate powder, a cyclic silicate powder and a linear silicate powder are superior in the $SF_6$-gas resistance even if they contain $SiO_2$ in their compositions. In particular, the molded article using the silicate powder having the olivine structure selected among the independent silicates exhibits an $SF_6$-gas resistance identical to the case using the alumina filler; and this has superior resistance to decomposed gas from $SF_6$-gas.

Moreover, FIG. 5 showed that $SF_6$-gas resistance of the resin setting substance filled with an organic polymer powder was the same as that filled with alumina, and there was no problem.

Table 5 shows components used in Examples 16 to 36.

TABLE 5

| | |
|---|---|
| Epoxy Resin | Epikote 828 available from Yuka Shell Epoxy K. K. (Bisphenol A diglycidyl ether) |
| Curing Agent | HN2200 available from Hitachi Chemical Co. Ltd. (Methyl tetrahydrophthalic anhydride) |
| Curing Accelerator | Epikure IBMI-12 available from Yuka Shell Epoxy K. K. (1-isobutyl-2-methylimidazole) |
| Silicate Powder | |
| Fosterite | |
| a | Raw talc and magnesium hydroxide were mixed in MgO amount of 60% in the composition, baked, and sized with a sieve. (Average particle diameter: about 3 μm) |
| f | Raw materials were mixed in MgO amount of 70% in the composition, and baked. (Average particle diameter: about 10 μm) |
| g | Raw materials were mixed in MgO amount of 95% in the composition, and baked. (Average particle diameter: about 15 μm) |
| h | Raw materials were mixed in MgO amount of 40% in the composition, and baked. (Average particle diameter: about 10 μm) |
| i | Raw materials were mixed in MgO amount of 20% in the composition, and baked. (Average particle diameter: about 9 μm) |
| Steatite | |
| f | FT-1300 available from Kinseimatech K. K. (average particle diameter: about 11 μm), MgO amount in the composition was 34% |
| g | Raw materials were mixed in MgO amount of 15% in the composition, and baked. (Average particle diameter: about 10 μm) |

TABLE 5-continued

| | |
|---|---|
| h | Raw materials were mixed in MgO amount of 80% in the composition, and baked. (Average particle diameter: about 13 μm) |
| Wollastonite | |
| i | FPW-400 available from Kinseimatech K. K. (Average particle diameter: about 9 μm). CaO amount in the composition was 44% |
| j | Raw materials were mixed in CaO amount of 75% in the composition, and baked. (Average particle diameter: about 13 μm) |
| k | Raw materials were mixed in CaO amount of 90% in the composition, and baked. (Average particle diameter: about 15 μm) |
| l | Raw materials were mixed in CaO amount of 30% in the composition, and baked. (Average particle diameter: about 13 μm) |
| m | Raw materials were mixed in CaO amount of 20% in the composition, and baked. (Average particle diameter: about 15 μm) |
| Monticellite | |
| n | Average particle diameter: about 65 μm. In the composition, MgO amount was 26%, and CaO amount was 36%. |
| o | Average particle diameter: about 52 μm. In the composition, MgO amount was 31%, and CaO amount was 43%. |
| p | Average particle diameter: about 47 μm. In the composition, MgO amount was 26%, and CaO amount was 60%. |
| q | Average particle diameter: about 60 μm. In the composition, MgO amount was 18%, and CaO amount was 29%. |
| r | Average particle diameter: about 63 μm. In the composition, MgO amount was 10%, and CaO amount was 24%. |
| Inorganic Powder | |
| Alumina | AS-20 available from Showa Denko K. K. (Average particle diameter: about 22 μm) |
| Fused Silica | RD-8 available from Tatumori K. K. (Average particle diameter: about 13 μm) |
| Magnesium Oxide | Star-mag SL available from Kinseimatech (Average particle diameter: about 11 μm) |

Examples 16 through 19

According to the blending ratio shown in Table 6, components other than a silicate powder and a curing accelerator were mixed for 10 minutes at a room temperature under an atmospheric pressure by using a kneading machine. To the obtained mixture was added the silicate powder, and the mixture was mixed for one hour at a room temperature under an atmospheric pressure. To the mixture was further added a curing accelerator and the mixtures was further mixed for 10 minutes at a room temperature under vacuum to obtain epoxy resin compositions 16 to 19 for an $SF_6$-gas insulating device of the present invention.

The obtained resin compositions 16 to 19 were injected into an injection mold made of glass. After the composition was heated and molded at 130° C. for six hours in a high-temperature bath, it was further heated and molded at 150° C. for six hours to obtain plate-shaped molded articles 16 to 19 (3 mm in thickness).

$SF_6$-gas resistance, dielectric constant, flexural strength and cracking resistance of the obtained molded products were measured according to the above-mentioned methods. Table 6 shows the results thereof.

TABLE 6

| | Example | | | | Comparative Example | |
|---|---|---|---|---|---|---|
| | 16 | 17 | 18 | 19 | 4 | 5 |
| Ingredients (% by volume) | | | | | | |
| Epoxy Resin | 28.6 | 34.3 | 34.3 | 28.6 | 28.6 | 28.6 |
| Curing Agent | 21.2 | 25.5 | 25.5 | 21.2 | 21.2 | 21.2 |
| Curing Accelerator | 0.2 | 0.2 | 0.2 | 0.2 | 0.2 | 0.2 |
| Silicate Powder | | | | | | |
| Forsterite (a) | 50.0 | | | | | |
| Steatite (f) | | 40.0 | | | | |
| Wollastonite (i) | | | 40.0 | | | |
| Monticellite (n) | | | | 50.0 | | |
| Inorganic Powder | | | | | | |
| Alumina ($Al_2O_3$) | | | | | 50.0 | |
| Fused Silica ($SiO_2$) | | | | | | 50.0 |
| Results | | | | | | |
| Glass Transition Temperature Tg (° C.) | 134.3 | 131.6 | 134.3 | 132.9 | 130.2 | 133.0 |
| Dielectric Constant (60 Hz) | 4.9 | 4.6 | 5.0 | 5.3 | 6.5 | 4.6 |
| Flexural Strength (kgf/$mm^2$) | 12.5 | 11.0 | 14.2 | 10.6 | 10.7 | 13.1 |
| $SF_6$-gas resistance | ○ | ○ | ○ | ○ | ○ | x |
| Cracking resistance | 12 | 15 | 14 | 11 | 10 | 20 |

From the results shown in Table 6 it was confirmed that the dielectric constant of the resin molded articles in Examples 16 to 19 showed a lower value than that using the alumina filler in Comparative Example 4 and that they were more effective in reducing the dielectric constant as compared with conventional resin molded articles using the alumina filler. The $SF_6$-gas resistance of Examples 16 to 19 was superior to that using the silica in Comparative Example 5. In particular, an $SF_6$-gas resistance of the resin molded articles. (Examples 16, 19) filled with silicate powder of forsterite and monticellite was the same as the alumina filler, and that in spite that they contained silicate components, they exhibited superior properties. The cracking resistance of the molded articles in Examples 16 to 19 showed a value higher than that of the alumina filler; and steatite (Example 17) and wollastonite (Example 18) showed a high cracking resistance even if an amount of filling into the resin composition was low. Moreover, the flexural strength and the glass transition temperature (Tg) of the resin molded articles in Examples 16 to 19 showed values identical to, or higher than those of the alumina filler in Comparative Example 4, and they were superior in the mechanical property and heat resistance.

Examples 20 to 27

Except that forsterite, steatite, forsterite and magnesium oxide, and forsterite and silica in an amount shown in Table 7 were used as the silicate powder, epoxy resin compositions 20 to 27 for an $SF_6$-gas insulating device and plate-shaped molded articles 20 to 27 of the present invention were prepared and evaluated in the same manner as Example 16. Table 7 shows the results thereof.

Comparative Examples 4 and 5

Except that a blending ratio was changed to that shown in Table 7, comparative resin compositions 4 to 5 and comparative molded articles 4 to 5 were prepared and evaluated in the same manner as Example 16. Table 7 shows the results thereof.

TABLE 7

| | Example | | | | | | | | | | Comparative Example | |
|---|---|---|---|---|---|---|---|---|---|---|---|---|
| | 16 | 20 | 21 | 22 | 23 | 17 | 24 | 25 | 26 | 27 | 4 | 5 |
| Ingredients (% by volume) | | | | | | | | | | | | |
| Epoxy Resin | 28.6 | 28.6 | 28.6 | 28.6 | 28.6 | 34.3 | 34.3 | 34.3 | 28.6 | 28.6 | 28.6 | 28.6 |
| Curing agent | 21.2 | 21.2 | 21.2 | 21.2 | 21.2 | 25.5 | 25.5 | 25.5 | 21.2 | 21.2 | 21.2 | 21.2 |
| Curing Accelerator | 0.2 | 0.2 | 0.2 | 0.2 | 0.2 | 0.2 | 0.2 | 0.2 | 0.2 | 0.2 | 0.2 | 0.2 |
| Silicate Powder | | | | | | | | | | | | |
| Forsterite | | | | | | | | | | | | |
| (a) MgO amount = 60% | 50.0 | | | | | | | | 40.0 | 40.0 | | |
| (f) MgO amount = 70% | | 50.0 | | | | | | | | | | |
| (g) MgO amount = 95% | | | 50.0 | | | | | | | | | |
| (h) MgO amount = 40% | | | | 50.0 | | | | | | | | |
| (i) MgO amount = 20% | | | | | 50.0 | | | | | | | |
| Steatite | | | | | | | | | | | | |
| (f) MgO amount = 34% | | | | | | 40.0 | | | | | | |
| (g) MgO amount = 15% | | | | | | | 40.0 | | | | | |
| (h) MgO amount = 80% | | | | | | | | 40.0 | | | | |
| Inorganic Powder | | | | | | | | | | | | |
| Alumina ($Al_2O_3$) | | | | | | | | | | | 50.0 | |
| Fused Silica ($SiO_2$) | | | | | | | | | | 10.0 | | 50.0 |
| Magnesium Oxide (MgO) | | | | | | | | | 10.0 | | | |
| Results | | | | | | | | | | | | |
| Glass Transition Temperature Tg (° C.) | 134.3 | 134.1 | 133.7 | 132.4 | 131.0 | 131.6 | 134.0 | 131.0 | 132.9 | 134.0 | 130.2 | 133.0 |
| Dielectric Constant (60 Hz) | 4.9 | 5.3 | 6.6 | 4.5 | 4.1 | 4.6 | 4.0 | 6.1 | 5.8 | 4.8 | 6.5 | 4.6 |
| Flexural Strength (kgf/$mm^2$) | 12.5 | 11.8 | 11.0 | 12.6 | 13.3 | 11.0 | 12.9 | 13.3 | 10.5 | 12.9 | 10.7 | 13.1 |
| $SF_6$-gas resistance | ○ | ○ | ○ | ○ | Δ | ○ | x | ○ | ○ | Δ | ○ | x |
| Cracking resistance | 12 | 11 | 10 | 13 | 14 | 15 | 15 | 14 | 11 | 17 | 10 | 20 |

From the results shown in Table 7 it was confirmed that the flexural strength of the resin molded articles filled with forsterite in Examples 16 and 20 to 23, the resin molded articles filled with steatite in Examples 17, 24 and 25, and the resin molded articles filled with forsterite and magnesium oxide in Example 26, and forsterite and silica in Example 27 showed a value identical to, or higher than that of the alumina filler in Comparative Example 4. Moreover, the cracking resistance and the glass transition temperature (Tg) of the resin molded articles in Examples 16, 17 and 20 to 27 showed values identical to, or higher than those of the alumina filler in Comparative Example 4. This confirmed that an amount of MgO in the composition of these fillers did not give any adverse effects on these properties.

Figure 6:
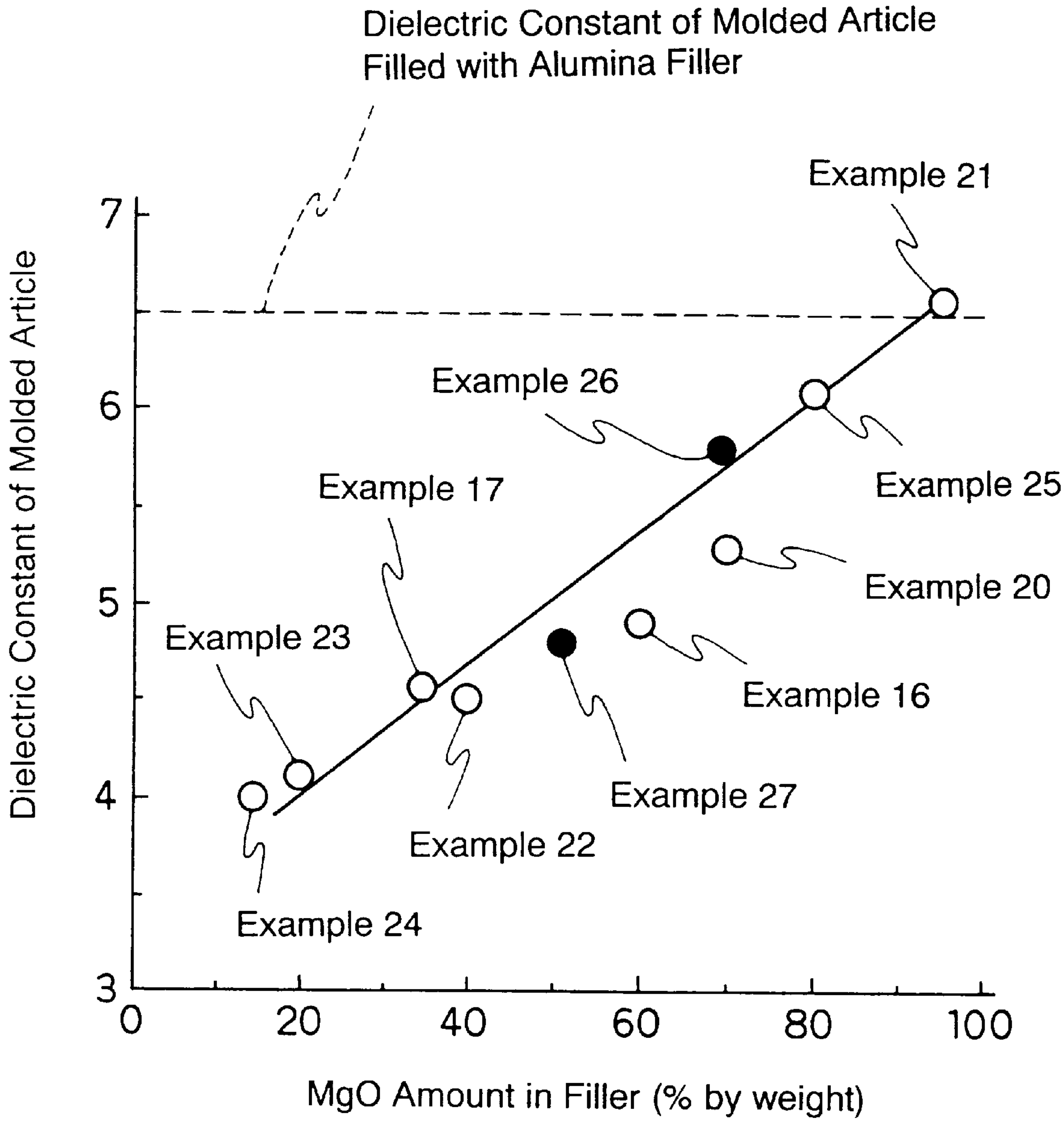
FIG. 6 is a graph showing the relationship between the amount of MgO component in a silicate compound mainly comprising MgO and $SiO_2$, and the dielectric constant of the obtained molded article.

Based upon the results of Examples 16, 17 and 20 to 27 as well as Comparative Example 4, FIG. 6 shows the relationship between an amount (% by weight) of MgO component in the fillers (forsterite, steatite, magnesium oxide, silica) of the silicate compounds mainly containing MgO and $SiO_2$ and the dielectric constant of the plate-shaped molded articles.

FIG. 6 shows that the higher the amount (% by weight) of MgO component in the filler, the higher the dielectric constant of the molded article. When the amount of MgO component in the filler becomes at least 95% by weight, the dielectric constant becomes virtually equal to the value of the conventional filler in Comparative Example 4 using alumina, and reduction in the effects of a low dielectric constant becomes low. Consequently, the amount of MgO component in the filler is preferably less than 95% by weight.

Examples 28 to 36

Except that forsterite, wollastonite and monticellite having compositions shown in Table 8 were used as the silicate powder, epoxy resin compositions 28 to 36 for an $SF_6$ gas insulating device and plate-shaped molded articles 28 to 36 of the present invention were prepared and evaluated in the same manner as Example 16. Table 9 shows the results thereof.

TABLE 8

| | Example | | | | | | | | | | | Comparative Example | |
|---|---|---|---|---|---|---|---|---|---|---|---|---|---|
| | 18 | 28 | 29 | 30 | 31 | 19 | 32 | 33 | 34 | 35 | 36 | 4 | 5 |
| Ingredients (% by volume) | | | | | | | | | | | | | |
| Epoxy Resin | 34.3 | 34.3 | 34.3 | 34.3 | 34.3 | 28.6 | 28.6 | 28.6 | 28.6 | 28.6 | 28.6 | 28.6 | 28.6 |
| Curing Agent | 25.5 | 25.5 | 25.5 | 25.5 | 25.5 | 21.2 | 21.2 | 21.2 | 21.2 | 21.2 | 21.2 | 21.2 | 21.2 |
| Curing Accelerator | 0.2 | 0.2 | 0.2 | 0.2 | 0.2 | 0.2 | 0.2 | 0.2 | 0.2 | 0.2 | 0.2 | 0.2 | 0.2 |
| Silicate Powder | | | | | | | | | | | | | |
| Forsterite | | | | | | | | | | | | | |
| (a) MgO amount = 60% | | | | | | | | | | | 30.0 | | |
| Wollastonite | | | | | | | | | | | | | |
| (i) CaO amount = 44% | 40.0 | | | | | | | | | | 20.0 | | |
| (j) CaO amount = 75% | | 40.0 | | | | | | | | | | | |
| (k) CaO amount = 90% | | | 40.0 | | | | | | | | | | |
| (l) CaO amount = 30% | | | | 40.0 | | | | | | | | | |
| (m) CaO amount = 20% | | | | | 40.0 | | | | | | | | |
| Monticellite | | | | | | | | | | | | | |
| (n) MgO amount = 26%, CaO amount = 36% | | | | | | 50.0 | | | | | | | |
| (o) MgO amount = 31%, CaO amount = 43% | | | | | | | 50.0 | | | | | | |
| (p) MgO amount = 26%, CaO amount = 60% | | | | | | | | 50.0 | | | | | |
| (q) MgO amount = 18%, CaO amount = 29% | | | | | | | | | 50.0 | | | | |
| (r) MgO amount = 10%, CaO amount = 24% | | | | | | | | | | 50.0 | | | |
| Inorganic Powder | | | | | | | | | | | | | |
| Alumina ($Al_2O_3$) | | | | | | | | | | | | 50.0 | |
| Fused Silica ($SiO_2$) | | | | | | | | | | | | | 50.0 |

TABLE 9

| | Example | | | | | | | | | | | Comparative Example | |
|---|---|---|---|---|---|---|---|---|---|---|---|---|---|
| | 18 | 28 | 29 | 30 | 31 | 19 | 32 | 33 | 34 | 35 | 36 | 4 | 5 |
| Results | | | | | | | | | | | | | |
| Glass Transition Temperature Tg (° C.) | 134.3 | 131.8 | 132.5 | 130.7 | 131.6 | 132.9 | 130.1 | 131.9 | 130.1 | 131.9 | 132.0 | 130.2 | 133.0 |

TABLE 9-continued

| | Example | | | | | | | | | | | Comparative Example | |
|---|---|---|---|---|---|---|---|---|---|---|---|---|---|
| | 18 | 28 | 29 | 30 | 31 | 19 | 32 | 33 | 34 | 35 | 36 | 4 | 5 |
| Dielectric Constant (60 Hz) | 5.0 | 5.7 | 6.4 | 4.3 | 4.2 | 5.3 | 5.9 | 6.3 | 4.8 | 4.3 | 5.1 | 6.5 | 4.6 |
| Flexural Strength (kgf/mm$^2$) | 14.2 | 13.8 | 12.5 | 14.5 | 14.8 | 10.6 | 10.8 | 10.5 | 11.0 | 11.5 | 12.9 | 10.7 | 13.1 |
| $SF_6$-gas resistance | ○ | ○ | ○ | ○ | Δ | ○ | ○ | ○ | ○ | ○ | ○ | ○ | x |
| Cracking resistance | 14 | 12 | 11 | 15 | 17 | 11 | 11 | 10 | 12 | 15 | 13 | 10 | 20 |

From the results shown in Table 9 it was confirmed that the flexural strength of the resin molded articles filled with wollastonite in Examples 18 and 28 to 31, the resin molded articles filled with monticellite in Examples 19 and 32 to 35, and the resin molded articles filled with mixed forsterite and wollastonite in Example 36 showed a value identical to, or higher than that of the alumina filler in Comparative Example 4. Moreover, the cracking resistance and the glass transition temperature (Tg) of the resin molded articles of Examples 18, 19 and 28 to 36 showed values identical to, or higher than those of the alumina filler in Comparative Example 4. This confirmed that the amount of CaO or MgO in the compositions of these fillers did not give any adverse effects on these properties.

Figure 7:
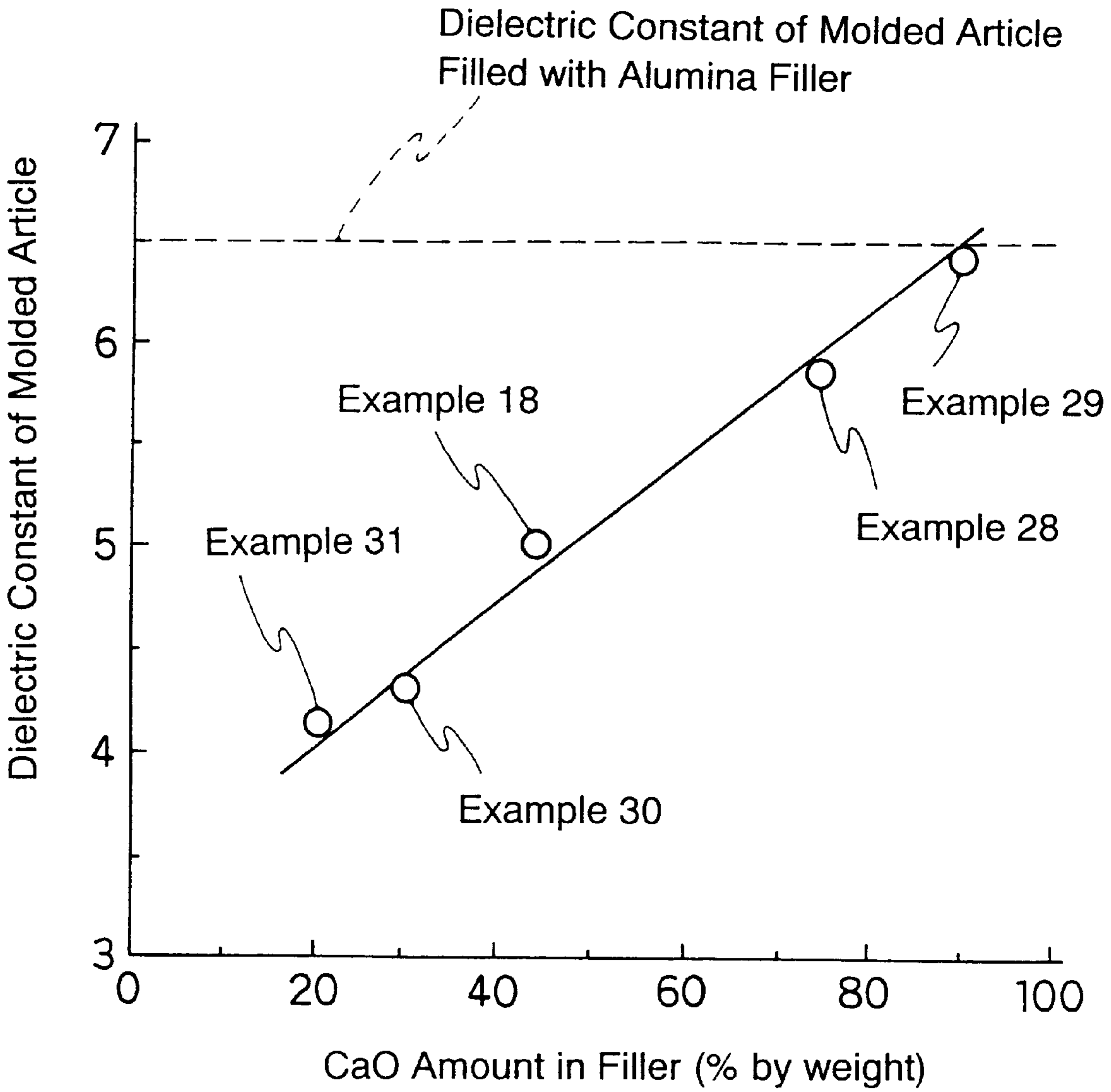
FIG. 7 is a graph showing the relationship between the amount of CaO component in a silicate compound mainly comprising CaO and $SiO_2$ and the dielectric constant of the obtained molded article.

Based upon the results of Examples 18, and 28 to 31 as well as Comparative Example 4, FIG. 7 shows the relationship between the CaO component or the amount (% by weight) of CaO component in the fillers (wollastonites), and the dielectric constant of the obtained plate-shaped molded articles.

FIG. 7 shows that the higher the amount (% by weight) of the CaO component in wollastonite is, the higher the dielectric constant of the molded article is. When the amount of the CaO component in the filler becomes at least 90% by weight, the dielectric constant becomes virtually equal to the value of the conventional filler in Comparative Example 4 using alumina, and reduction in the effects of a low dielectric constant becomes low. Consequently, the amount of the CaO component in wollastonite is preferably at most 90% by weight.

Figure 8:
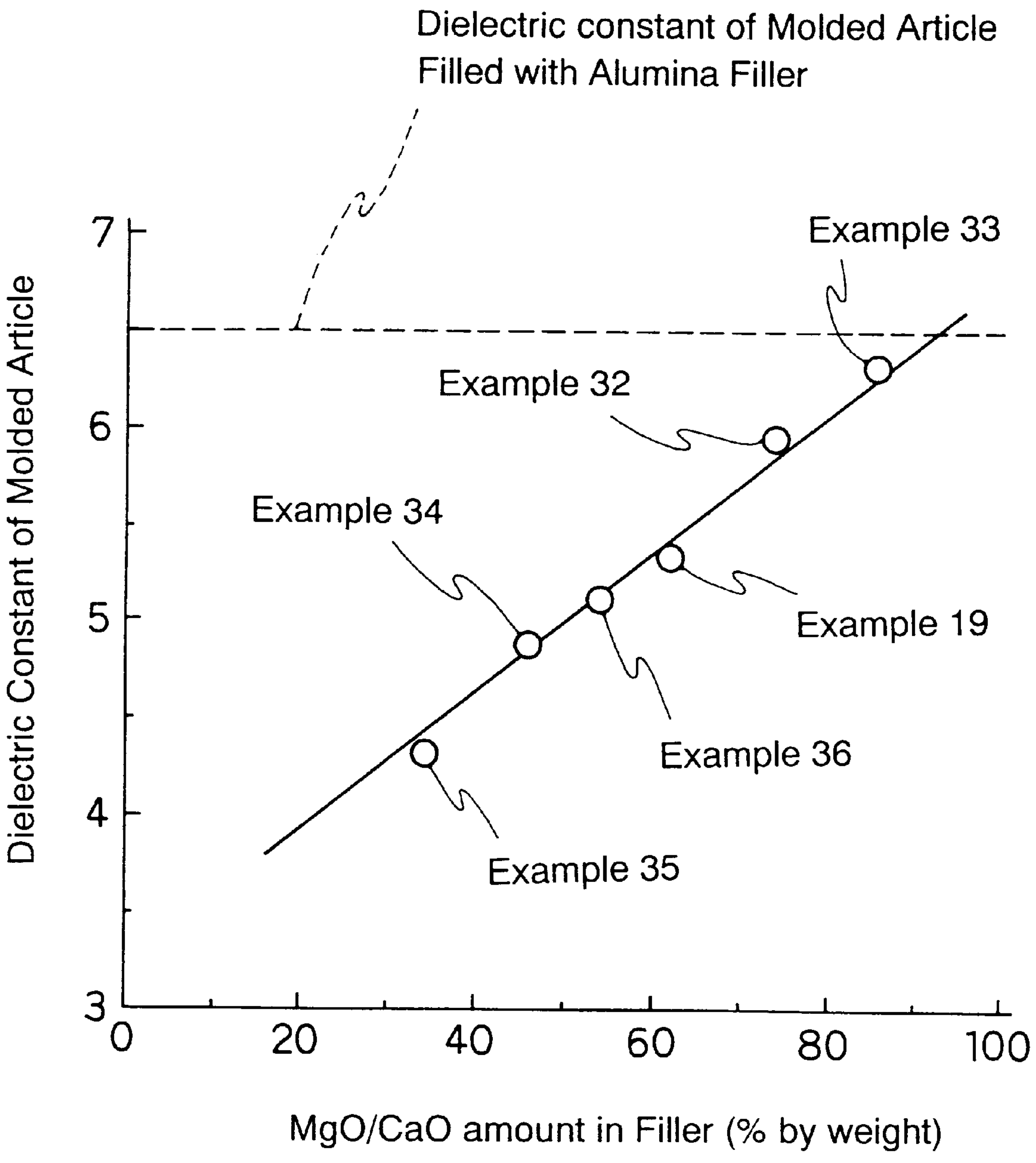
FIG. 8 is a graph showing the relationship between the amount of MgO and CaO components in a silicate compound mainly comprising MgO, CaO and $SiO_2$ and the dielectric constant of the obtained molded article.

Based on the results of Examples 19, and 32 to 36 as well as Comparative Example 4, FIG. 8 shows the relationship between the total amount (% by weight) of MgO and CaO components in the fillers (monticellite and mixed filler) and the dielectric constant of the obtained plate-shaped molded articles.

FIG. 8 shows that the higher the total amount (% by weight) of MgO and CaO components in monticellite and mixed fillers, the higher the dielectric constant of the molded article. When the total amount of MgO and CaO components in the filler becomes at least 90% by weight, the dielectric constant becomes virtually equal to the value of the conventional filler in Comparative Example 4 using alumina, and a reduction in the effects of a low dielectric constant becomes low. Consequently, the total amount of MgO and CaO components in the filler is preferably at most 90% by weight.

Experimental Examples 4 to 8

At measuring the $SF_6$-gas resistance in Examples 16 to 36 and Comparative Examples 4 and 5, after inducing DC voltage of 500 V, the exposing time during which the plate-shaped molded article was exposed to a mixed gas of $SF_6$-gas and HF gas was successively varied from 0 minute, 10 minutes, 20 minutes, 30 minutes, 40 minutes, 60 minutes, 180 minutes to 300 minutes. Then, while the voltage was maintained, the surface resistance (Ω) of the plate-shaped molded article at the respective exposing times was measured according to JIS-K6911. The smaller the variation in the surface resistance becomes, the more excellent the $SF_6$-gas resistance becomes.

Experimental Example 4 corresponding to Examples 16 to 19 using silicate compounds, Experimental Example 5 corresponding to Examples 16, 17, 21, 23, 24 and 25 in which the amount of MgO component of a silicate filler (forsterite and steatite) mainly comprising MgO and $SiO_2$ was varied, Experimental Example 6 corresponding to Examples 26 and 27 in which the amount of MgO component in the filler was varied, Experimental Example 7 corresponding to Examples 18, 28 and 31 in which the amount of CaO component of a silicate filler (wollastonite) mainly comprising CaO and $SiO_2$ was varied, and Experimental Example 8 corresponding to Examples 19 and 32 to 36 in which the total amount of MgO and CaO components of a silicate filler (monticellite and mixed filler group) mainly comprising CaO, MgO and $SiO_2$ was varied, were obtained, and the results thereof are shown in FIGS. 9 to 13. FIGS. 9 to 13 show the relationship between the exposing time to the mixed gas of $SF_6$ and HF, and the surface resistance.

Figure 9:
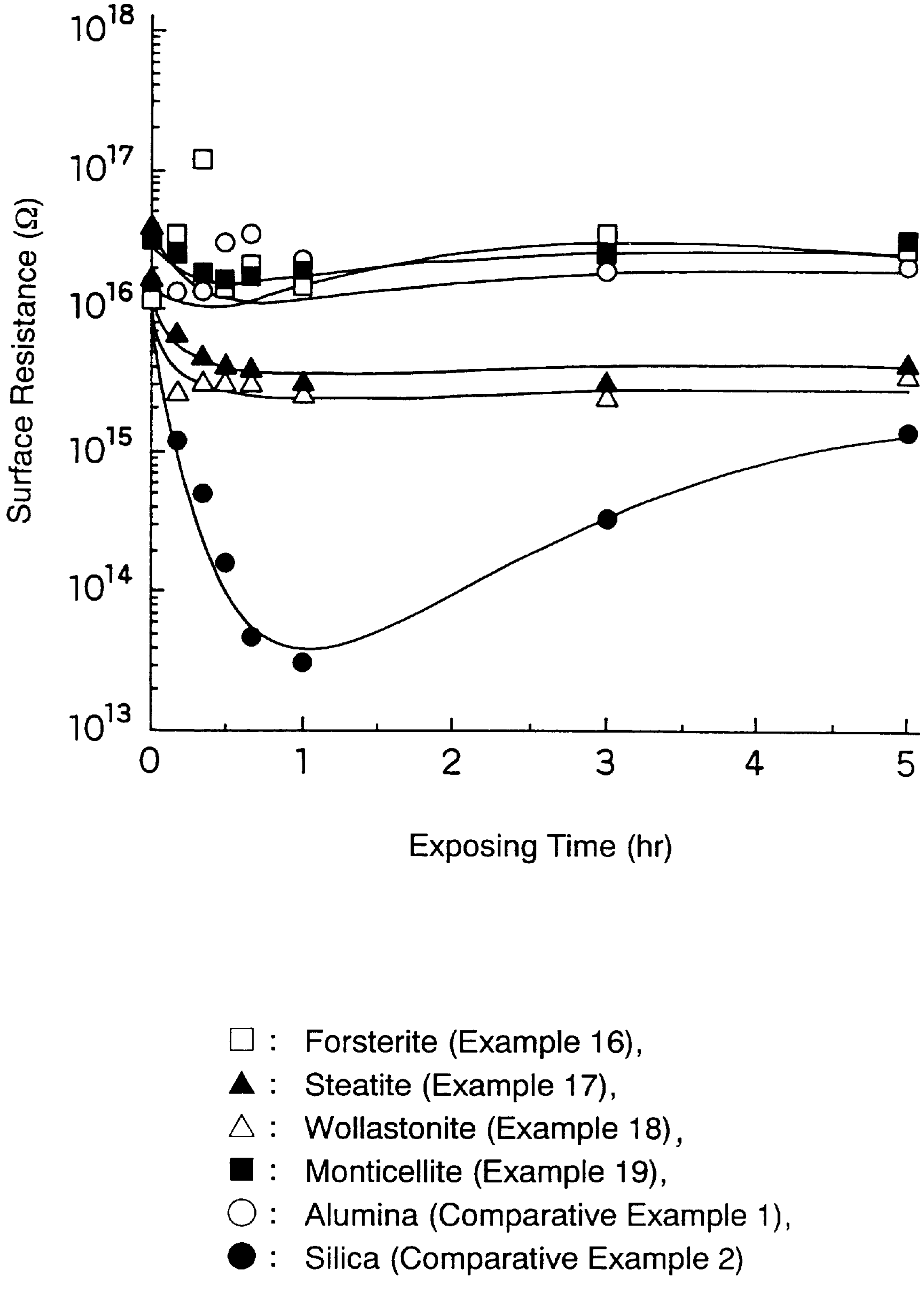
FIG. 9 is a graph showing the relationship between the exposing time to a mixed gas and the surface resistance of the molded article using a forsterite group, steatite group, wollastonite group or monticellite group silicate as the silicate compound.

FIG. 9 shows that in case of filling the silica ($SiO_2$) filler in Comparative Example 5, the surface resistance drops greatly immediately after gas injection, that is, from $10^{16}$Ω to $10^{12}$Ω. In contrast to this, in case of the molded article using the silicate (forsterite, steatite, wollastonite, or monticellite) filler of Examples 16 to 19, a ratio of a drop is smaller than the molded product using the silica filler. Thus, it was confirmed that the molded article obtained by using the silicate powder exhibited a superior $SF_6$-gas resistance, even if $SiO_2$ was contained in its composition.

Figure 10:
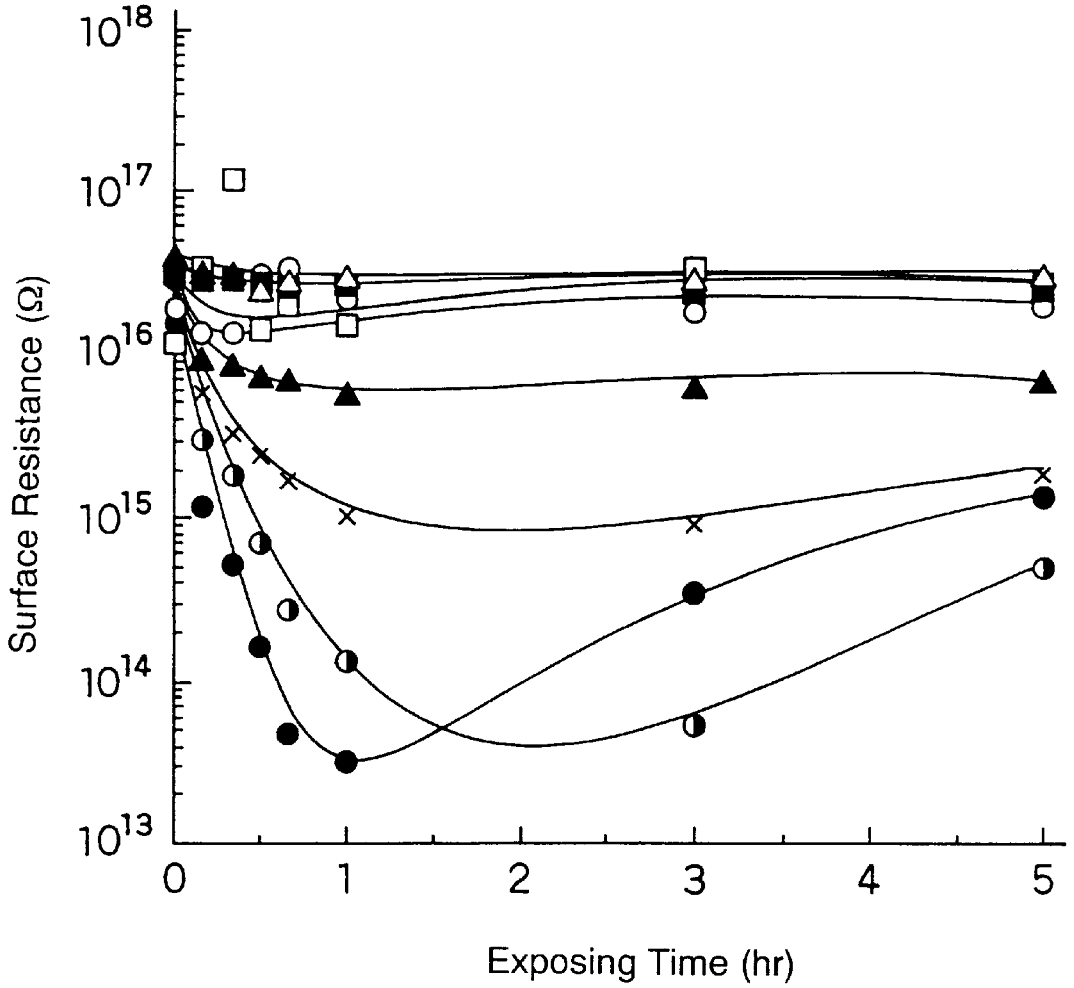
FIG. 10 is a graph showing the relationship between the exposing time to a mixed gas and the surface resistance of the molded article using a silicate compound mainly comprising MgO and $SiO_2$.

Moreover, FIG. 10 shows that in case of the molded article using the silicate compound (forsterite or steatite) mainly comprising MgO and $SiO_2$ of Examples 16, 17, 21, 23, 24 and 25, the drop of the surface resistance depends on the amount of the MgO component in the filler. In the case of a molded article using a silicate compound filler having a high amount of the MgO component of at least 60% by weight, it exhibits an $SF_6$-gas resistance as high as the case using alumina, it is superior in the resistance to decomposed gas from $SF_6$-gas. In case of a molded article using silicate filler having an MgO amount of at most 60 weight %, the drop starts immediately after gas injection, but the value is maintained at a higher level as compared with the case using the silica filler. However, in case of a molded article using silicate filler having a MgO component of at most 15% by weight, the value drops to the same level as the molded article using the silica filler. Consequently, it is considered that from the viewpoint of proper $SF_6$-gas resistance, the amount of the MgO component in the filler is preferably at least 16% by weight.

Figure 11:
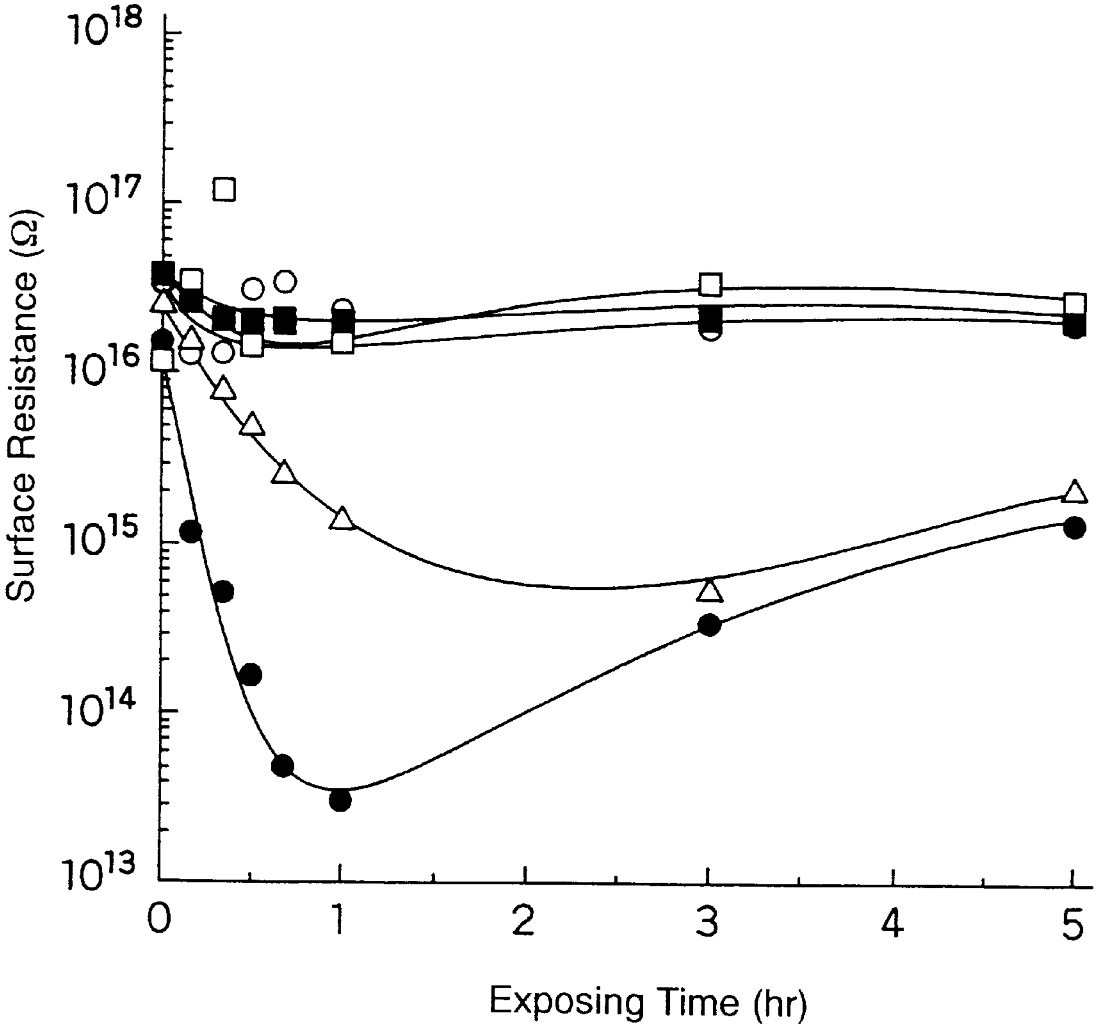
FIG. 11 is a graph showing the relationship between the exposing time to a mixed gas and the surface resistance of the molded article using a mixture of forsterite and magnesium oxide (MgO) or silica ($SiO_2$).

FIG. 11 shows the variation in the surface resistance of a molded article in which the amount of the MgO component is varied in the filler formed by combining forsterite, magnesium oxide and silica as shown in Examples 26 and 27.

When the amount of the MgO component in the filler is high (an amount of MgO component: 70% by weight), the molded article exhibits an $SF_6$-gas resistance similar to the case using alumina, and it is superior in the resistance to decomposed gas from $SF_6$-gas. In case of a high amount of the MgO component in the filler (an amount of MgO component: 50% by weight), the ratio of a value drop is smaller than the molded article using the silica filler.

Figure 12:
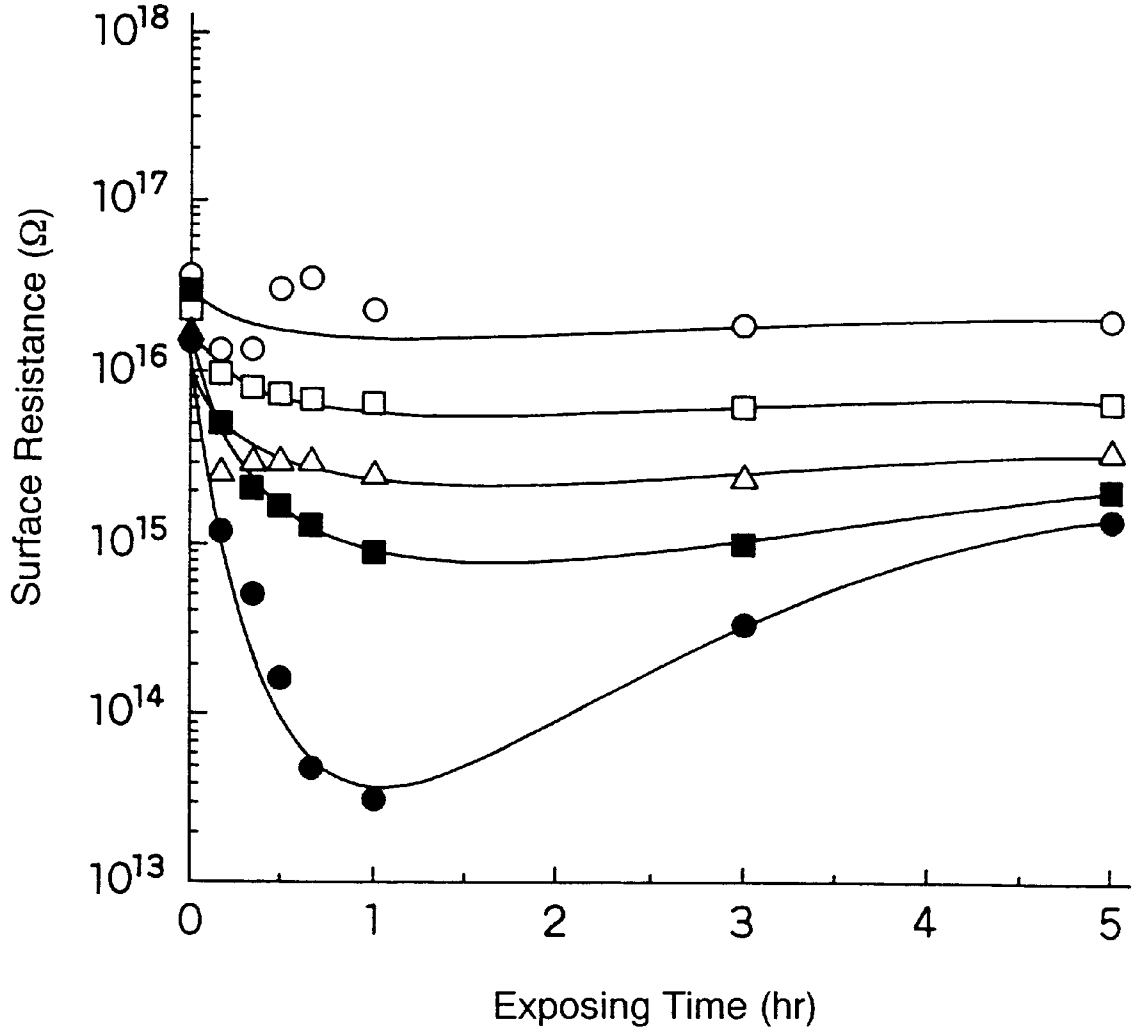
FIG. 12 is a graph showing the relationship between the exposing time to a mixed gas and the surface resistance of the molded article using a silicate compound mainly comprising CaO and $SiO_2$.

FIG. 12 shows that in case of the molded article using the silicate compound (wollastonite) mainly comprising CaO and $SiO_2$ in Examples 18, 28, 31, a ratio of the surface resistance drop depends on the amount of the CaO component in the filler. In case of a molded article using silicate filler having a high amount of the CaO component, it exhibits an $SF_6$-gas resistance as high as the case using alumina, and it is superior in the resistance to decomposed gas from $SF_6$-gas. In case of a molded article using silicate compound filler having a low MgO amount, the drop starts immediately after gas injection, but the value is maintained at a higher level as compared with the case using the silica filler. However, in case of a molded article using silicate filler having a CaO amount of 20% by weight, the value drops to the same level as the molded article using the silica filler. Consequently, it is considered that from the viewpoint of proper $SF_6$-gas resistance, the amount of the CaO component in the filler is preferably at least 20% by weight.

Figure 13:
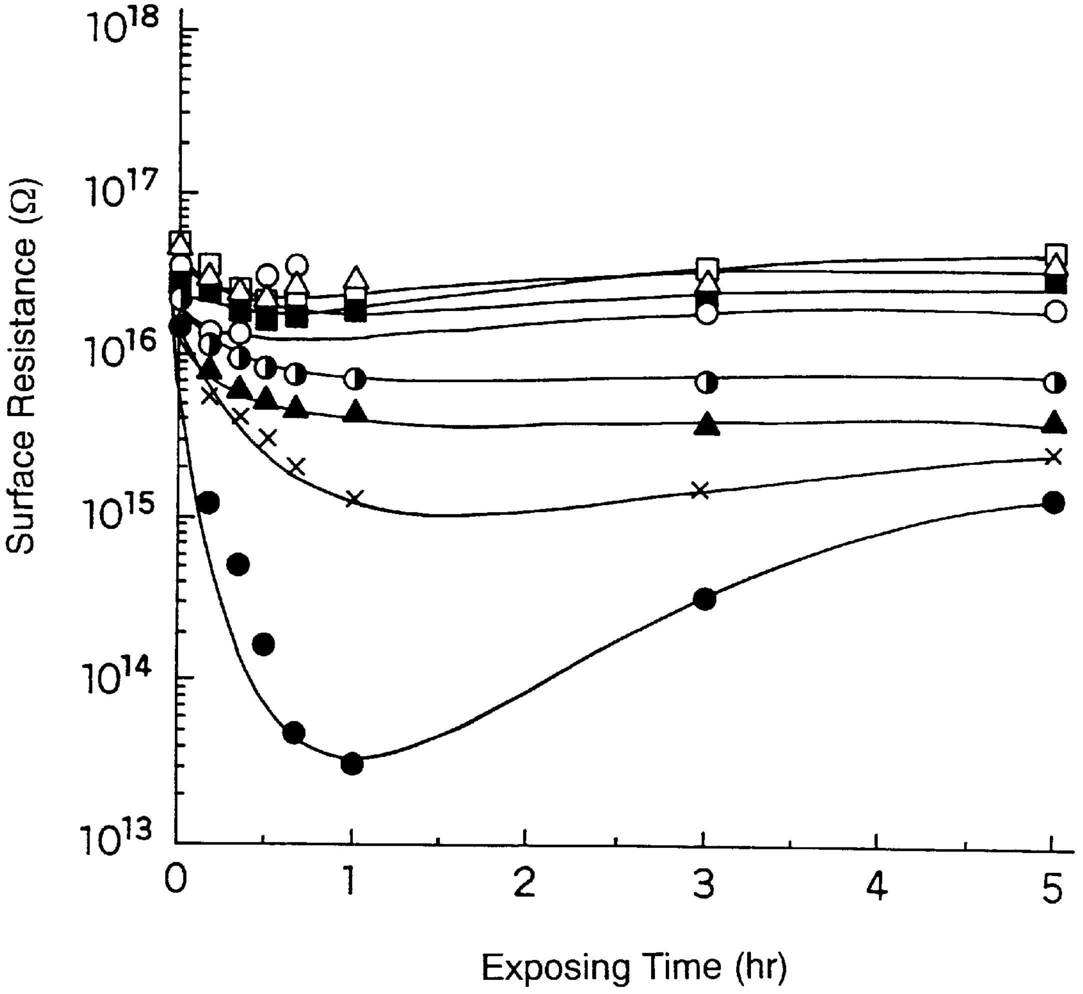
FIG. 13 is a graph showing the relationship between the exposing time to a mixed gas and the surface resistance of the molded article using a silicate compound mainly comprising MgO, CaO and $SiO_2$.

FIG. 13 shows that in case of the molded article using the silicate compound (monticellite and mixed filler group) mainly comprising CaO, MgO and $SiO_2$ of Examples 19 and 32 to 36, a ratio of the surface resistance drop depends on the total amount of the MgO and CaO components in the filler. In case of a molded article using silicate filler having a high total amount of the MgO and CaO component, it exhibits an $SF_6$-gas resistance as high as the case using alumina, and it is superior in the resistance to decomposed gas from $SF_6$ gas. In case of a molded article using silicate filler having a low total amount of the CaO and MgO components, the drop starts immediately after gas injection, the value is maintained at a higher level as compared with the case using the silica filler. However, in the case of a molded article using silicate compound filler having a total amount of the CaO and MgO components of 34% by weight, the value is maintained at a level slightly higher than that of the case using the silica filler. Consequently, it is considered that from the viewpoint of proper $SF_6$-gas resistance, the total amount of the MgO and CaO components in the filler is preferably at least 20% by weight.

Thus, it is confirmed that the molded article using the silicate compound (forsterite, steatite, wollastonite and monticellite) filler is superior in the $SF_6$-gas resistance even if $SiO_2$ is contained in its composition. In particular, a molded article using silicate powder having a low amount of the $SiO_2$ component in the composition is allowed to exhibit an $SF_6$-gas resistance as high as the case using alumina, and it has superior resistance to decomposed gas from $SF_6$ gas.

By adding a silicate compound powder particularly comprising an independent silicate, a cyclic silicate, or a linear silicate, to an epoxy resin, it is possible to obtain an epoxy resin composition which can provide an insulating molded article having a low dielectric constant that is superior in the resistance to decomposed product (HF gas) from $SF_6$ gas, mechanical strength and crashing resistance in a well-balanced manner.

By adding powder of the independent silicate selected from the group consisting of forsterite, fayalite, tephroite, knebelite and monticellite to an epoxy resin, it is possible to obtain an epoxy resin composition, which is superior in the $SF_6$-gas resistance and mechanical strength.

By adding powder of zircon which is an independent silicate compound to an epoxy resin, it is possible to obtain an epoxy resin composition, which can properly provide a low thermal expansion property, a high electric insulating property and an arc resistant property.

By adding powder of cordierite which is a cyclic silicate compound to an epoxy resin, it is possible to obtain an epoxy resin composition, which is superior in the $SF_6$-gas resistance and mechanical strength and does not contain toxic Be.

By adding powder of wollastonite which is a linear silicate compound to an epoxy resin, it is possible to obtain an epoxy resin composition, which is superior in the $SF_6$-gas resistance, mechanical strength and crash resistance.

By adding the silicate compound powder comprises fine particles having an average particle diameter of not more than 100 $\mu$m or needle-shaped substances having an average fiber diameter of not more than 100 $\mu$m to an epoxy resin, it is possible to obtain an epoxy resin composition, which is superior in the fluidity and mechanical strength in a well-balanced manner.

By adding powder of the silicate compound selected from the group consisting of a silicate compound mainly comprising MgO and $SiO_2$, the silicate compound mainly comprising CaO and $SiO_2$ and the silicate compound mainly comprises CaO, MgO and $SiO_2$ to an epoxy resin, it is possible to obtain an epoxy resin composition which is superior in the $SF_6$-gas resistance and mechanical strength and has a lower dielectric constant.

The $SF_6$-gas insulating device of the present invention comprising the epoxy resin composition containing a silicate compound powder has a low dielectric constant which is superior in the mechanical and thermal properties, and which is also superior in the $SF_6$-gas resistance even if it contains $SiO_2$ component in its composition.

What is claimed is:

1. An epoxy resin composition for an $SF_6$ gas insulating device, which is prepared by adding an independent silicate compound powder or a linear silicate compound powder to an epoxy resin.

2. The epoxy resin composition for an $SF_6$-gas insulating device of claim 1, wherein the silicate compound is an independent silicate.

3. The epoxy resin composition for an $SF_6$-gas insulating device of claim 1, wherein the silicate compound is a linear silicate.

4. The epoxy resin composition for an $SF_6$-gas insulating device of claim 2, wherein the independent silicate is a silicate selected from the group consisting of forsterite, fayalite, tephroite, knebelite and monticellite that have an olivine structure.

5. The epoxy resin composition for an $SF_6$-gas insulating device of claim 2, wherein the independent silicate is zircon.

6. The epoxy resin composition for an $SF_6$-gas insulating device of claim 3, wherein the linear silicate is wollastonite belonging to the pyroxene group.

7. The epoxy resin composition for an $SF_6$-gas insulating device of claim 1, wherein the silicate compound powder comprises fine particles having an average particle diameter of not more than 100 $\mu$m or needle-shaped substances having an average fiber diameter of not more than 100 $\mu$m.

8. The epoxy resin composition for an $SF_6$-gas insulating device of claim 1, wherein the silicate compound mainly comprises MgO and $SiO_2$.

9. The epoxy resin composition for an $SF_6$-gas insulating device of claim 8, wherein an amount of MgO is 16 to 94% by weight in the composition.

10. The epoxy resin composition for an $SF_6$-gas insulating device of claim 1, wherein the silicate compound mainly comprises CaO and $SiO_2$.

11. The epoxy resin composition for an $SF_6$-gas insulating device of claim 10, wherein an amount of CaO is 20 to 90% by weight in the composition.

12. The epoxy resin composition for an $SF_6$-gas insulating device of claim 1, wherein the silicate compound mainly comprises CaO, MgO and $SiO_2$.

13. The epoxy resin composition for an $SF_6$-gas insulating device of claim 12, wherein a total amount of MgO and CaO component is 20 to 90% by weight in the composition.

14. The epoxy resin composition for an $SF_6$-gas insulating device of claim 1, wherein the silicate compound powder comprises at least one silicate compound selected from the group consisting of a silicate compound mainly comprising MgO and $SiO_2$, a silicate compound mainly comprising CaO and $SiO_2$, and a silicate compound mainly comprising CaO, MgO and $SiO_2$.

15. An $SF_6$-gas insulating device comprising the composition of claim 1.

16. An epoxy resin composition for an $SF_6$-gas insulating device, which is prepared by adding, to an epoxy resin, a powder selected from the group consisting of (i) a powder comprising at least two silicate compounds of an independent and/or a linear silicate compound, (ii) a powder comprising an independent silicate or a linear silicate compound and another silicate compound, and (iii) a powder comprising an independent silicate or linear silicate compound and an inorganic powder other than the silicate compound.

* * * * *